United States Patent
Park et al.

(10) Patent No.: US 9,891,070 B2
(45) Date of Patent: Feb. 13, 2018

(54) MOBILE TERMINAL AND CONTROL METHOD FOR THE MOBILE TERMINAL

(71) Applicant: LG ELECTRONICS INC., Seoul (KR)

(72) Inventors: Jinhyoung Park, Seoul (KR); Sukjin Lee, Seoul (KR); Gukchan Lim, Seoul (KR); Mihyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 47 days.

(21) Appl. No.: 14/697,406

(22) Filed: Apr. 27, 2015

(65) Prior Publication Data

US 2016/0161277 A1 Jun. 9, 2016

(30) Foreign Application Priority Data

Dec. 8, 2014 (KR) ........................ 10-2014-0175259

(51) Int. Cl.
*G01C 21/36* (2006.01)
*G06F 3/0481* (2013.01)
(Continued)

(52) U.S. Cl.
CPC ....... *G01C 21/3664* (2013.01); *G01C 21/343* (2013.01); *G01C 21/3614* (2013.01);
(Continued)

(58) Field of Classification Search
None
See application file for complete search history.

(56) References Cited

U.S. PATENT DOCUMENTS 8,160,815 B2 * 4/2012 Geelen ............... G01C 21/3641
701/410
8,457,875 B2 * 6/2013 Jung ................... G01C 21/3644
701/533
(Continued)

FOREIGN PATENT DOCUMENTS

JP 2004233056 8/2004
JP 4260574 4/2009
(Continued)

OTHER PUBLICATIONS

European Patent Office Application No. 15001891.9, Search Report dated May 13, 2016, 8 pages.
(Continued)

*Primary Examiner* — John Olszewski
*Assistant Examiner* — David P. Merlino
(74) *Attorney, Agent, or Firm* — Lee, Hong, Degerman, Kang & Waimey

(57) ABSTRACT

The present disclosure relates to a mobile terminal capable of providing map information and a control method thereof. A mobile terminal according to an embodiment of the present disclosure may include a display unit configured to display map information containing preset route information and at least one graphic object linked to place information and a controller configured to change the preset route information based on place information linked to any one graphic object when a drag touch started from the any one graphic object of the at least one graphic object is released from the map information.

18 Claims, 15 Drawing Sheets

(51) Int. Cl.
  *G01C 21/34* (2006.01)
  *G09B 29/00* (2006.01)
  *G06F 3/0488* (2013.01)
  *G06F 3/0484* (2013.01)

(52) U.S. Cl.
  CPC ....... *G01C 21/3676* (2013.01); *G06F 3/0488* (2013.01); *G06F 3/04817* (2013.01); *G06F 3/04842* (2013.01); *G09B 29/007* (2013.01)

(56) References Cited

U.S. PATENT DOCUMENTS

| | | | | |
|---|---|---|---|---|
| 2004/0054428 | A1* | 3/2004 | Sheha | G01C 21/3664 700/56 |
| 2004/0254723 | A1* | 12/2004 | Tu | G01C 21/3679 701/410 |
| 2005/0085994 | A1 | 4/2005 | Kimura | |
| 2006/0253247 | A1* | 11/2006 | de Silva | G01C 21/3611 701/426 |
| 2007/0279438 | A1* | 12/2007 | Takakura | G06F 3/0481 707/E17.026 |
| 2009/0037101 | A1* | 2/2009 | Koike | G01C 21/3664 701/533 |
| 2009/0171576 | A1* | 7/2009 | Kim | G01C 21/3632 701/533 |
| 2009/0192703 | A1* | 7/2009 | Hess | G01C 21/3664 701/532 |
| 2011/0153141 | A1 | 6/2011 | Beechie | |
| 2011/0166774 | A1 | 7/2011 | Schunder | |
| 2011/0224896 | A1* | 9/2011 | Napieraj | G01C 21/3614 701/532 |
| 2012/0038669 | A1* | 2/2012 | Lee | G06F 3/04817 345/633 |
| 2013/0103313 | A1 | 4/2013 | Moore et al. | |
| 2013/0176377 | A1* | 7/2013 | Ho | H04M 1/72522 348/14.02 |
| 2014/0081881 | A1* | 3/2014 | Radhakrishnan | G06Q 10/047 705/319 |
| 2014/0282234 | A1* | 9/2014 | Ku | G06F 3/04817 715/800 |
| 2014/0365970 | A1* | 12/2014 | Jeong | G06F 3/04817 715/835 |
| 2015/0051829 | A1* | 2/2015 | Gearhart | G01C 21/3682 701/467 |
| 2015/0204685 | A1* | 7/2015 | Gearhart | G01C 21/3664 701/533 |
| 2015/0276423 | A1* | 10/2015 | McIlhany | G01C 21/367 701/426 |
| 2015/0309689 | A1* | 10/2015 | Jin | G06F 3/04817 715/765 |
| 2016/0069699 | A1* | 3/2016 | Chen | G01C 21/3682 701/426 |
| 2016/0117072 | A1* | 4/2016 | Sharifi | G06F 3/04842 715/769 |

FOREIGN PATENT DOCUMENTS

| | | |
|---|---|---|
| JP | 2010038824 | 2/2010 |
| JP | 2010256347 | 11/2010 |

OTHER PUBLICATIONS

European Patent Office Application No. 15001891.9, Search Report dated Sep. 26, 2016, 22 pages.

* cited by examiner

MOBILE TERMINAL AND CONTROL METHOD FOR THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0175259, filed on Dec. 8, 2014, the contents of which is incorporated by reference herein in its entirety.

BACKGROUND OF THE INVENTION

1. Field of the Invention

The present disclosure relates to a mobile terminal capable of providing map information and a control method thereof.

2. Description of the Related Art

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Various new attempts have been applied to implement a complicated function of the multimedia player in the aspect of hardware and software. For an example, there is provided a user interface environment for allowing a user to search or select a function in an easy and convenient manner.

In addition, in recent years, the function of a global positioning system (GPS) module provided in the mobile terminal has been enhanced, thereby more accurately determining a current location of the mobile terminal. Accordingly, the utilization of map information displayed on the mobile terminal has been gradually increased.

SUMMARY OF THE INVENTION

An aspect of the present disclosure is to provide a mobile terminal capable of providing a GUI optimized for the display of map information, and a control method thereof.

Another aspect of the present disclosure is to provide a mobile terminal capable of controlling various information that can be provided from map information using a graphic object, and a control method thereof.

Still another aspect of the present disclosure is to provide a mobile terminal capable of interlocking information provided from map information with another application using a graphic object, and a control method thereof.

In order to accomplish the foregoing objectives, a mobile terminal according to an embodiment of the present disclosure may include a display unit configured to display map information containing preset route information and at least one graphic object linked to place information, and a controller configured to change the preset route information based on place information linked to any one graphic object when a drag touch started from the any one graphic object of the at least one graphic object is released from the map information.

According to an embodiment, at least one place information may be linked to the graphic object, and the changed route information may be formed to pass through a place corresponding to any one place information among the at least one place information when the drag touch is released from the map information.

According to an embodiment, the controller may select any one place information satisfying a preset condition among the at least one place information, and the any one place information satisfying a preset condition may be at least one of place information previously set by a user, place information having the largest value linked to the place information, and place information located the nearest to the preset route information among the at least one place information.

According to an embodiment, category information associated with place information may be linked to the graphic object, and the controller may display at least one icon for guiding the selection of at least one place information corresponding to category information linked to the graphic object on the map information when a drag touch started from the graphic object is released from the map information.

According to an embodiment, a location at which the at least one icon is displayed may vary according to a position from which a drag touch started from the graphic object is released.

According to an embodiment, the controller may display the icon at a position corresponding to place information corresponding to the category information in the entire region of map information currently displayed on the display unit when the drag touch is released from a region other than the preset route information of the map information, and display the icon at a position corresponding to place information corresponding to the category information within a reference range based on the one position of the map information when the drag touch is released from one position of a region displayed with the preset route information.

According to an embodiment, the preset route information may be changed based on a preset type of touch being applied to the icon.

According to an embodiment, a second graphic object linked to at least two first graphic objects may be displayed on the display unit, and different category information associated with place information may be linked to each other on the at least two first graphic objects linked to the second graphic object, and the at least two first graphic objects may be displayed on the display unit based on a preset type of touch being applied to the second graphic object.

According to an embodiment, the controller may display at least one icon capable of selecting place information corresponding to category information linked to the selected first graphic object on the map information when either one of the at least two first graphic objects is selected, and select place information corresponding to an icon to which the touch is applied when a preset type of touch is applied to either one of the at least one icon.

According to an embodiment, the icon to which the touch is applied may be changed to the same image as that of the selected first graphic object.

According to an embodiment, when at least two of icons displayed on the map information are selected, the controller may set route information using place information corresponding to the selected icons.

According to an embodiment, the route information may be set to satisfy a preset condition associated with category information based on the category information of the place information.

According to an embodiment, the second graphic object may be linked to tab count information for generating at least two tabs, and the each tab may include map information, and the controller may generate at least two tabs containing map information based on tab count information linked to the second graphic object when the preset type of touch is applied to the second graphic object.

According to an embodiment, the controller may display the route information on one map information based on an icon linked to an overlap function being selected in a state that each route information is set on the at least two tabs.

According to an embodiment, at least one graphic object linked to an application may be displayed on the display unit, and the controller may perform a function associated with an application linked to any one graphic object based on a drag touch started from any one of at least one graphic object linked to the application being released from the map information.

According to an embodiment, the controller may display an execution screen of an application linked to the any one graphic object based on the drag touch being released, and the execution screen of the application may include place information corresponding to a position from which the drag touch is released.

According to an embodiment, at least one graphic object associated with specific place information may be displayed on the map information, and the controller may change a display form of graphic object displayed on the map information when the current location of the mobile terminal is adjacent to a place corresponding to the specific place information.

A method of controlling a mobile terminal according to an embodiment of the present disclosure may include the steps of displaying map information containing preset route information and at least one graphic object linked to place information, and changing the preset route information based on place information linked to any one graphic object when a drag touch started from the any one graphic object of the at least one graphic object is released from the map information.

According to an embodiment, at least one place information may be linked to the graphic object, and the changed route information may be formed to pass through a place corresponding to any one place information among the at least one place information when the drag touch is released from the map information.

According to an embodiment, said changing the route information may change the preset route information to pass through any one place information satisfying a preset condition among the at least one place information, and the any one place information satisfying a preset condition may be at least one of place information previously set by a user, place information having the largest value linked to the place information, and place information located the nearest to the preset route information among the at least one place information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
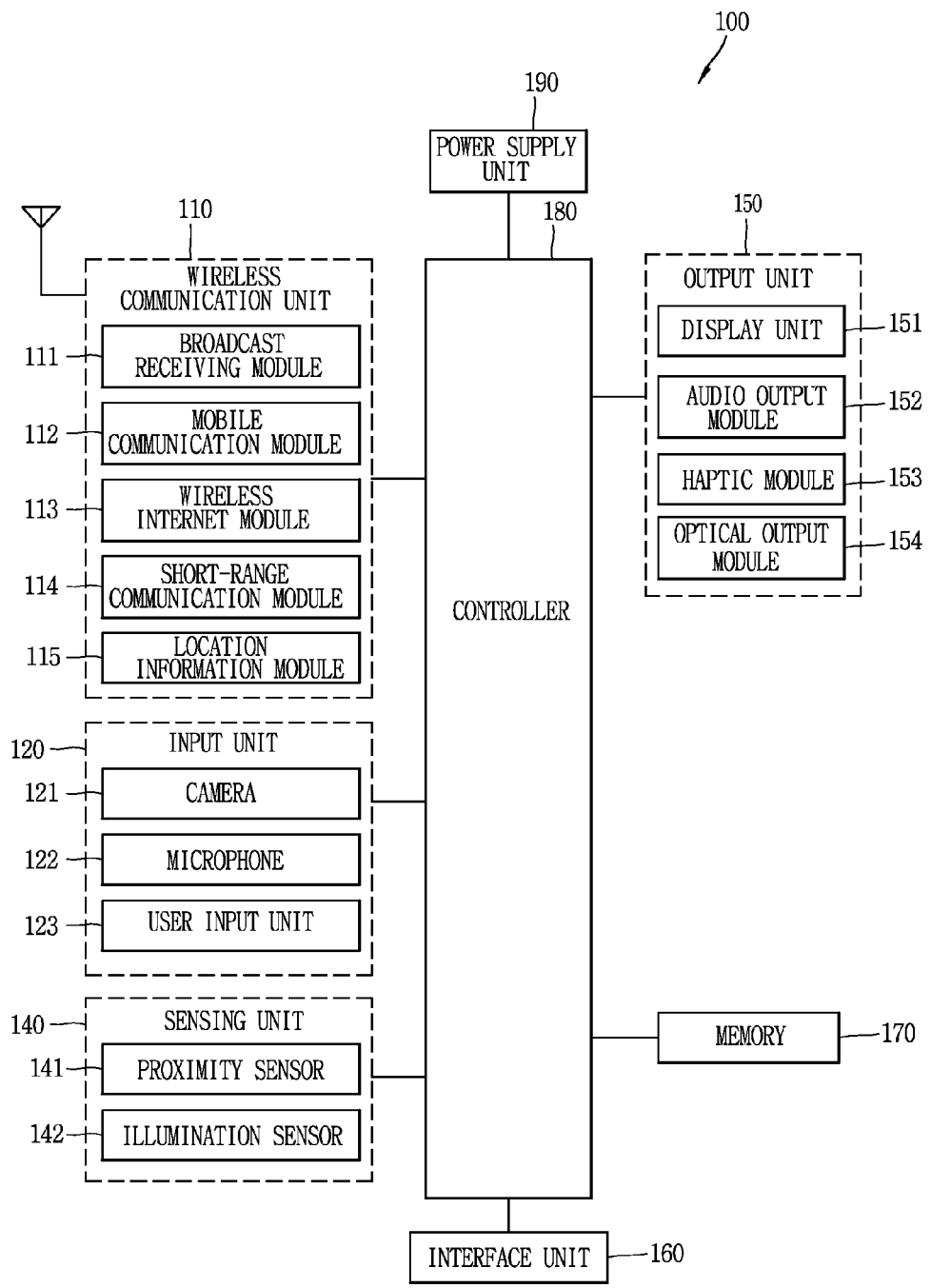
FIG. 1A is a block diagram illustrating a mobile terminal associated with the present disclosure.
Figure 1B:
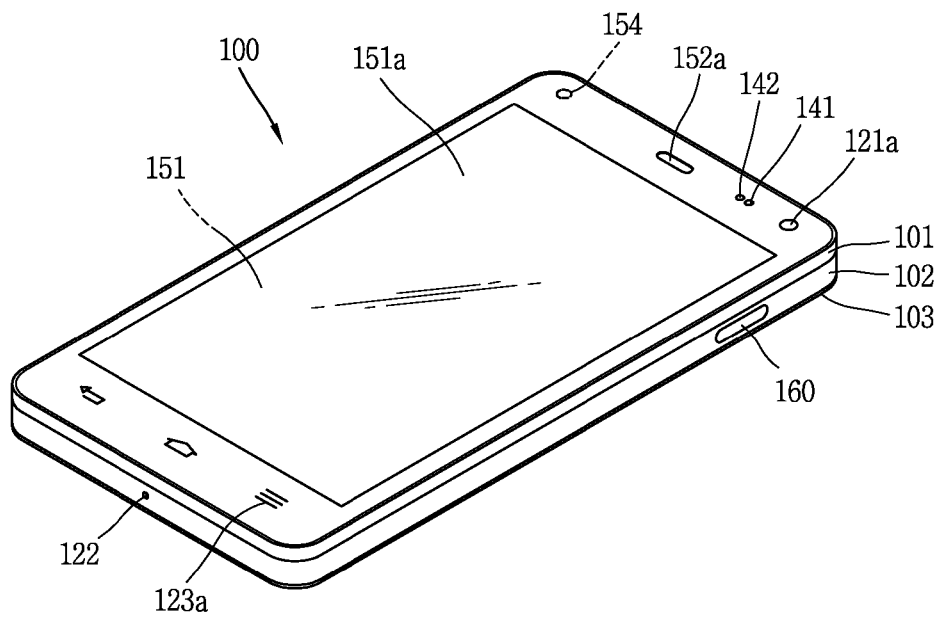
FIGS. 1B and 1C are conceptual views in which an example of a mobile terminal associated with the present disclosure is seen from different directions.
Figure 1C:
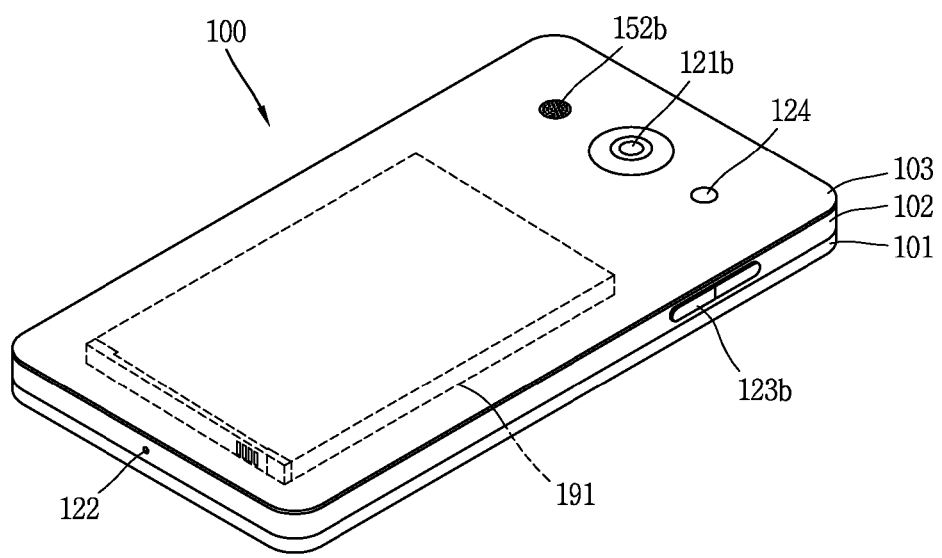

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory unit 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The present disclosure may be associated with a specific type of mobile terminal, but the description of the specific type of the mobile terminal may be typically applicable to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary mobile terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

Here, those components may not be limited to the arrangement, but be excluded or arranged on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151*a* and a display (not shown) on a rear surface of the window 151*a* or patterned directly on the rear surface of the window 151*a*. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

A location information module 115 of the mobile terminal is configured to acquire a position of the mobile terminal Such location information module 115 may include a Global Position System (GPS) module and a Wireless Fidelity (Wi-Fi) module. As needed, the location information module 115 may perform any function of the other modules of the wireless communication unit 110 to obtain data on the location of the mobile terminal in a substitutive or additional manner.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module.

The Wi-Fi positioning system may include a Wi-Fi location determination server, a mobile terminal 100, a wireless access point (AP) connected to the mobile terminal, and a database stored with any wireless AP information.

The mobile terminal 100 connected to the wireless AP may transmit a location information request message to the Wi-Fi location determination server.

The Wi-Fi location determination server extracts the information of the wireless AP connected to the mobile terminal 100, based on the location information request message of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, SSID, RSSI, channel information, privacy, network type, signal strength and noise strength.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, etc.

The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter.

Besides the above methods, various algorithms may be used to extract (analyze) location information of a mobile terminal.

Such extracted location information of the mobile terminal 100 is transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment where the mobile terminal 100 is positioned.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

Furthermore, in case where at least two images are illustrated in a two by two matrix in one drawing (FIG. N) when described below with reference to the accompanying drawings, an image illustrated in an upper left end thereof, an image illustrated in an upper right end thereof, an image illustrated in a lower right end thereof, and an image illustrated in a lower left end thereof are referred to as a "first drawing", a "second drawing", a "third drawing", and a "fourth drawing", respectively.

On the other hand, in case where at least two images are illustrated in a column from an upper end thereof to a lower end thereof in one drawing (FIG. N), they are sequentially referred to as a "first drawing", a "second drawing", . . . from the image at the uppermost end thereof.

A mobile terminal capable of containing at least one of the foregoing constituent elements according to an embodiment of the present disclosure may display map information on the display unit 151. The map information may be displayed based on an icon linked to the display of map information (or an icon of an application) being selected (or touched).

For example, map information displayed on the display unit 151 may be displayed based on the selection of an icon of a map-related application (for example, a map function application, a pathfinding function application, a traffic-related function application, etc.). When map information is displayed through the icon, the display unit 151 may be in an "on" state.

The map information 300 may be stored in the memory. In this case, when a map-related application is executed, the controller 180 am display the map information 300 stored in the memory on the display unit 151.

Furthermore, the map information 300 may be received from an external server (or external device). Specifically, when a map-related application is executed, the controller 180 may receive the map information 300 from an external server, and display the received map information 300 on the display unit 151.

On the other hand, the present disclosure may display various information on map information using the map information displayed on the display unit 151. The various information may include all kinds of information associated with map information, and for an example, may include location information, route information, traffic information, geographic information, photographed information, and the like.

For example, an icon capable of activating a GPS module may be displayed on the map information 300 displayed on the display unit 151. When the icon is selected, the controller 180 may acquire the location information of the mobile terminal 100. Then, the controller 180 may display an icon 820 for guiding the location of the mobile terminal 100 on the map information 300 based on the acquired location information of the mobile terminal 100.

For another example, when destination information is entered based on a user request, the controller 180 may display route information 310 between a place at which the mobile terminal is currently located and the entered destination on the map information 300. Furthermore, when departure and destination information are entered based on a user request, the controller 180 may display route information 310 between the entered departure and destination on the map information 300.

Through the foregoing configuration, the present disclosure may provide a user's location who possesses a mobile terminal using map information, and perform a navigation function using location information and route information displayed on the map information.

As described above, a mobile terminal capable of displaying map information according to an embodiment of the present disclosure may set route information using place information or a graphic object linked to category information associated with the place information or change preset route information. Hereinafter, a method of controlling route information provided from map information using a graphic object will be described in more detail with reference to the accompanying drawings.

Figure 2:
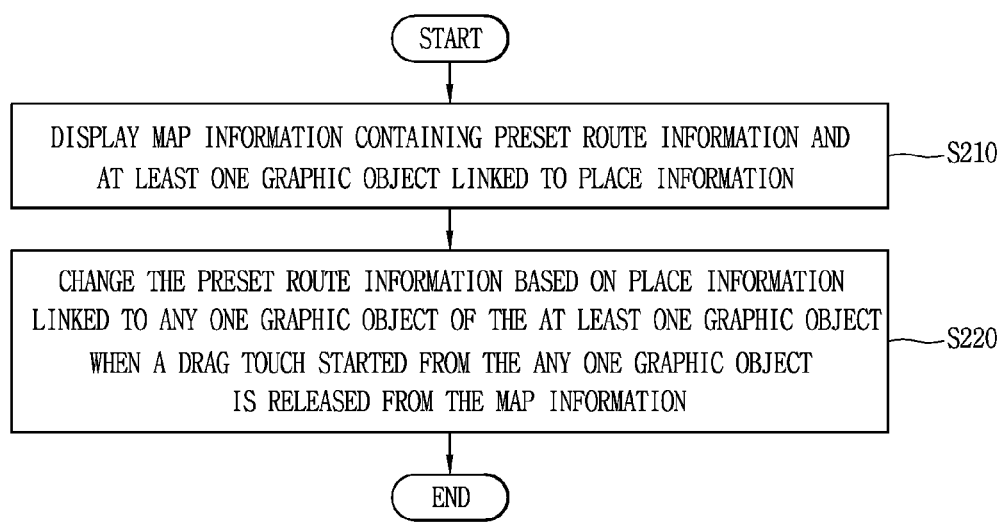
FIG. 2 is a flow chart representatively illustrating a control method of the present disclosure.
Figure 3:
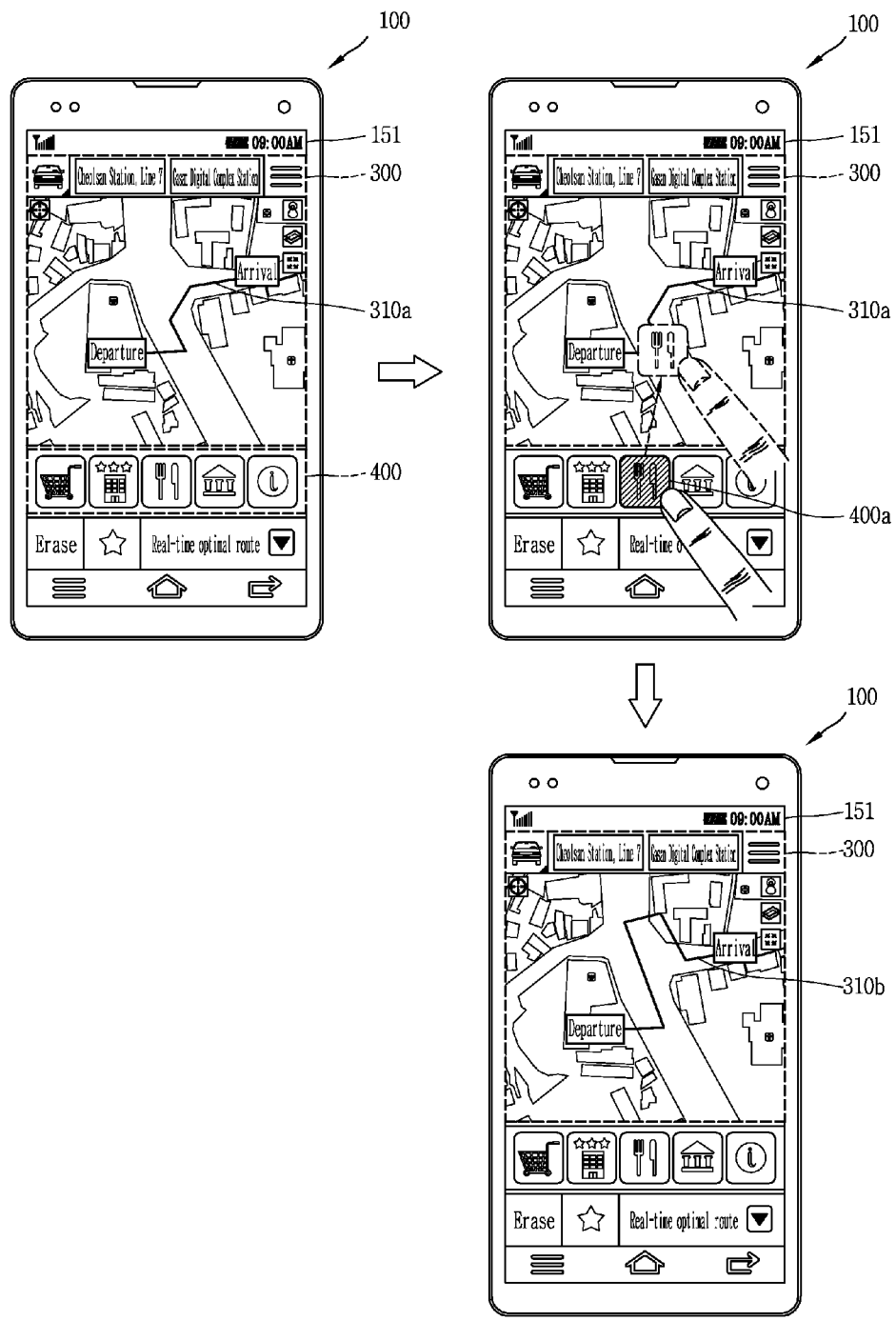
FIG. 3 is a conceptual view for explaining a control method shown in FIG. 2.

FIG. 2 is a flow chart representatively illustrating a control method of the present disclosure, and FIG. 3 is a conceptual view for explaining a control method shown in FIG. 2.

First, according to the present disclosure, the process of displaying map information containing preset route information and at least one graphic object linked to place information is carried out (S210).

The map information 300 may be displayed based on a icon of a map-related application (for example, a map function application, a pathfinding function application, a traffic-related function application, etc.). The map information 300 may be displayed on at least part of the display region of the display unit 151.

The present disclosure may perform various functions using the map information.

The controller 180 may move the map information 300 based on a preset type of touch (for example, a drag touch or flicking touch) being applied to the map information 300.

The controller 180 may zoom in (reduce) or out (enlarge) map information 300 based on a preset type of touch (for example, a pinch-in touch, a pinch-out touch, a double short touch) being applied to the map information 300.

Furthermore, when a preset type of touch (for example, a short touch) is applied to a place name contained in the map information 300, the controller 180 may display at least one of a graphic object linked to a detailed information display function on a place corresponding to the place name to which the touch is applied and a graphic object linked to a function of setting a place corresponding to the place name to which the touch is applied to a destination. The graphic object may be displayed to correspond to or adjacent to the place name to which the touch is applied.

Furthermore, when a preset type of touch (for example, a long touch) is applied to one position of a region displayed with the map information 300, the controller 180 may display at least one graphic object linked to various functions around a position to which the touch is applied. The various functions may include a departure setting function, a destination setting function, an address information display function, a distance measurement function, a sharing function, and the like, for an example.

On the other hand, route information 310 may be contained in the map information 300 displayed on the display unit 151. Specifically, the controller 180 may set the route information on map information based on at least one of the current location information of the mobile terminal and place information received from a user.

The route information 310 may be set based on current location information and destination information when the destination information is received from a user or set based on departure information and destination information when the departure information and destination information are received. Furthermore, the route information 310 may be set to pass through a stopover when stopover information is additionally received.

On the other hand, a mobile terminal according to an embodiment of the present disclosure may display at least one graphic object 400 linked to place information on the display unit 151. Specifically, the controller 180 may concurrently display at least one graphic object 400 linked the map information 300 and place information on the display unit 151.

For example, at least one graphic object 400 linked to the place information may be displayed based on the map information 300 being displayed on the display unit 151.

For another example, at least one graphic object 400 linked to the place information may be displayed based on a user request in a state that the map information 300 is displayed on the display unit 151. The user request may be a touch being applied to an icon linked to a function of displaying at least one graphic object linked to the place information, a button linked to a function of displaying the graphic object being selected from hardware buttons provided in the mobile terminal, a preset type of touch being applied to the map information, or the like.

Here, at least one place information may be linked to a graphic object 400 linked to place information. The at least one place information may be previously determined by a user's setting or may be place information corresponding to a specific category, place information previously registered on the map information 300 currently displayed on the display unit 151, and the like, among place information that can be provided through the map information 300.

A method of linking place information to the graphic object will be described later in more detail with reference to FIGS. 8A through 8C.

On the other hand, the graphic object 400 linked to the place information may denote a graphic object linked to category information associated with place information. Specifically, it is understood that the graphic object 400 linked to the place information is linked to corresponding to associated with place information.

For example, category information associated with the place information may indicate categories such as bus, subway, restaurant, cafe, bakery, bank, hospital, entertainment, convenience store, lodging, gas station, parking lot, sightseeing, and the like in which place information are classified according to a specific criteria for classification.

In other words, the graphic object 400 linked to the place information may be linked to at least one place information corresponding to specific category information. For example, when category information corresponding to restaurants is linked to the graphic object 400 linked to place information, it is understood that at least one place information (for example, restaurant "A", restaurant "B", restaurant "C", etc.) corresponding to the restaurant category among map information 300 displayed on the display unit 151 is linked to the graphic object 400.

The graphic object 400 may be formed in the form of various images that can identify place information or category information linked thereto.

In this manner, when route information is set, the controller 180 may display map information 300 containing preset route information and at least one graphic object 400 linked to place information on the display unit 151.

Then, when a drag touch started from any one graphic object 400a of the at least one graphic object 400 is released from the map information 300, the process of changing the preset route information based on place information linked to the any one graphic object 400a is carried out (S220).

The controller 180 may move any one graphic object 400a based on a drag touch extended from a touch applied to the any one graphic object 400a among the at least one graphic object 400.

When the drag touch is released from the map information 300, the controller 180 may change the preset route information 310a to another route information 310b based on place information linked to the any one graphic object 400a.

Here, releasing a drag touch started from a graphic object from map information should be understood that the graphic object moves on map information.

At least one place information may be linked to the graphic object 400. Specifically, at least one place information may be linked to the graphic objects 400, respectively. Furthermore, category information associated with place information may be linked to the graphic objects 400, respectively. It denotes that at least one place information corresponding to the category information is linked thereto.

The controller 180 may extract at least one place information corresponding to the category information from the map information 300 displayed on the display unit 151. Specifically, place information corresponding to each position may be set on the map information 300. When a drag touch started from the graphic object 400a linked to the place information is released from the map information 300, the controller 180 may search place information corresponding to place information linked to the graphic object 400a among place information set to the map information 300, and change the preset route information 310a to route information 310b passing through place information (place) linked to the graphic object 400a.

In case where at least one place information is linked to the graphic object 400a, the changed route information 310b may be formed to pass through any one place information among the at least one place information when the drag touch is released from the map information 300.

The foregoing description will be more clearly understood with reference to FIG. 3.

As illustrated in the first drawing of FIG. 3, map information 300 containing preset route information 310a and at least one graphic object linked to place information may be displayed on the display unit 151.

Then, as illustrated in the second drawing of FIG. 3, when a drag touch started from any one graphic object 400a among the at least one graphic object 400 is sensed, the controller 180 may move the any one graphic object 400a to correspond to the drag touch.

When the drag touch is released from the map information 300, the controller 180 may change the preset route information 310a to another route information 310b based on place information linked to the any one graphic object 400a as illustrated in the third drawing of FIG. 3.

The another route information 310b may be formed to pass through any one place information among at least one place information linked to the graphic object 400a to which the drag touch is applied.

For example, when place information on restaurant "A" is linked to the any one graphic object 400a, the controller 180 may change the preset route information 310a to route information 310b passing through the restaurant "A".

Through the foregoing configuration, the present disclosure may drag and drop a graphic object linked to place information to map information without searching an additional place to change preset route information. Accordingly, the user may be provided with a user interface capable of changing route information in more convenient manner.

Hereinafter, various embodiments of changing preset route information using a graphic object will be described in more detail with reference to the accompanying drawings.

Figure 4A:
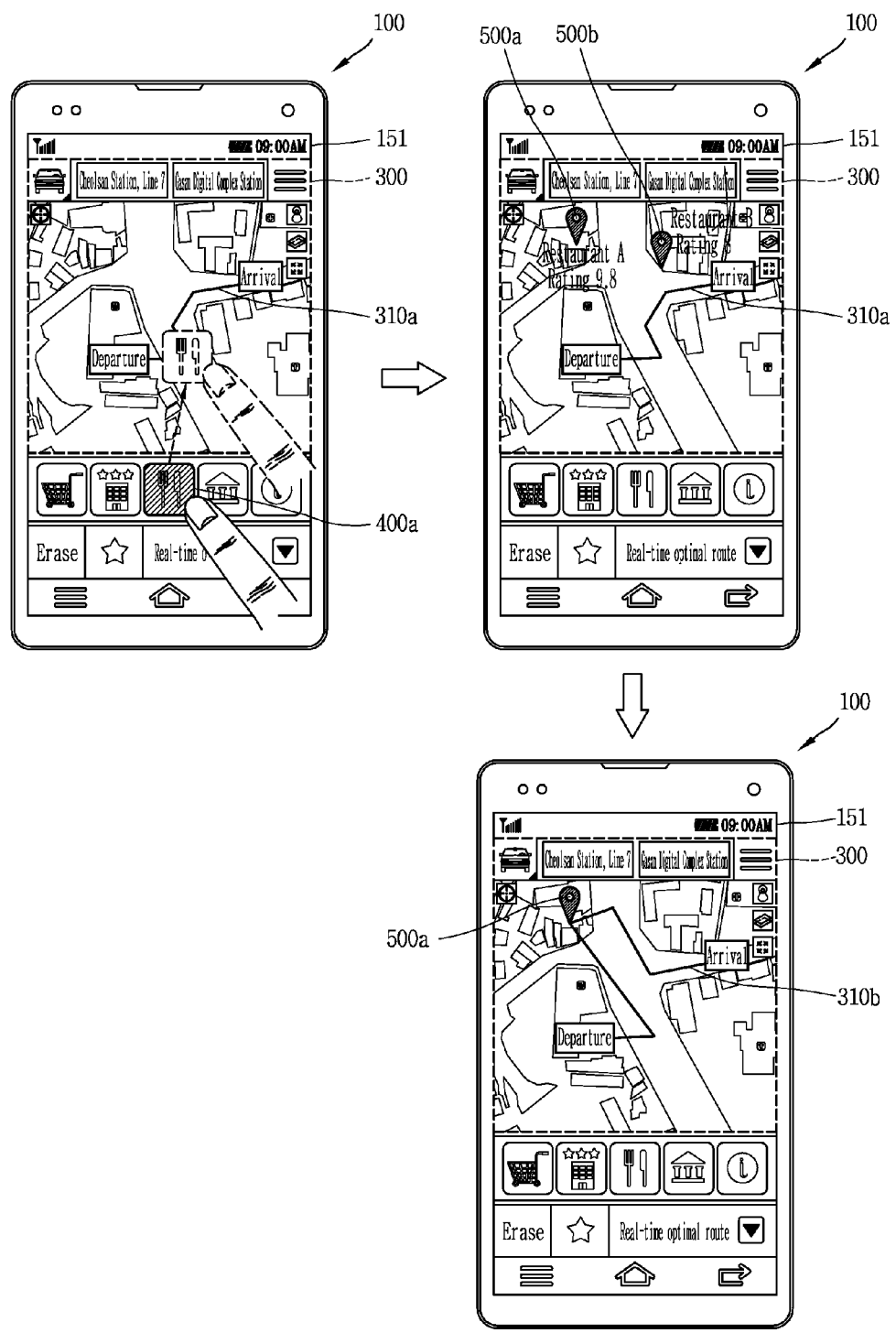
FIGS. 4A and 4B are conceptual views for explaining a method of changing preset route information using a graphic object linked to place information.
Figure 4B:
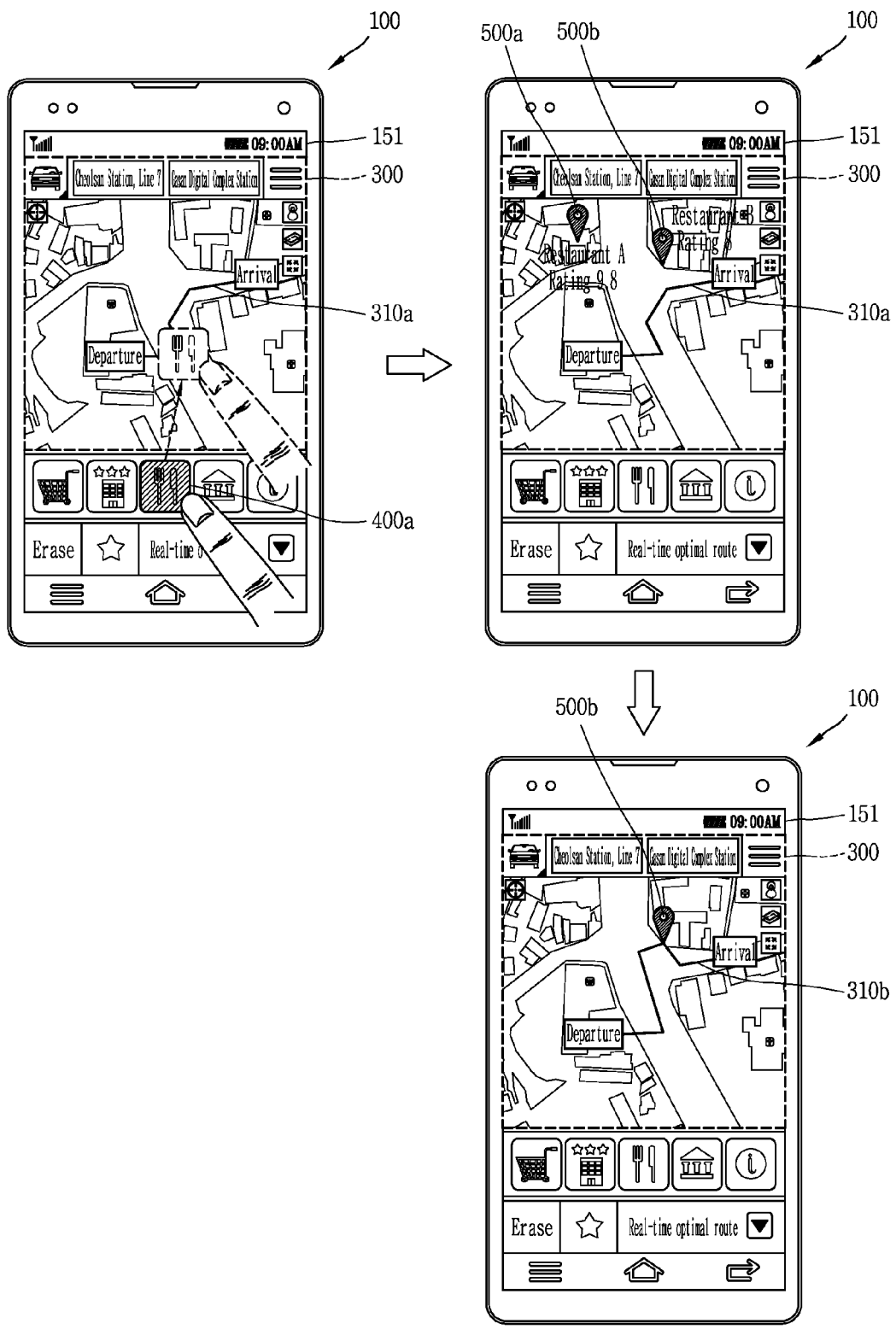
Figure 5A:
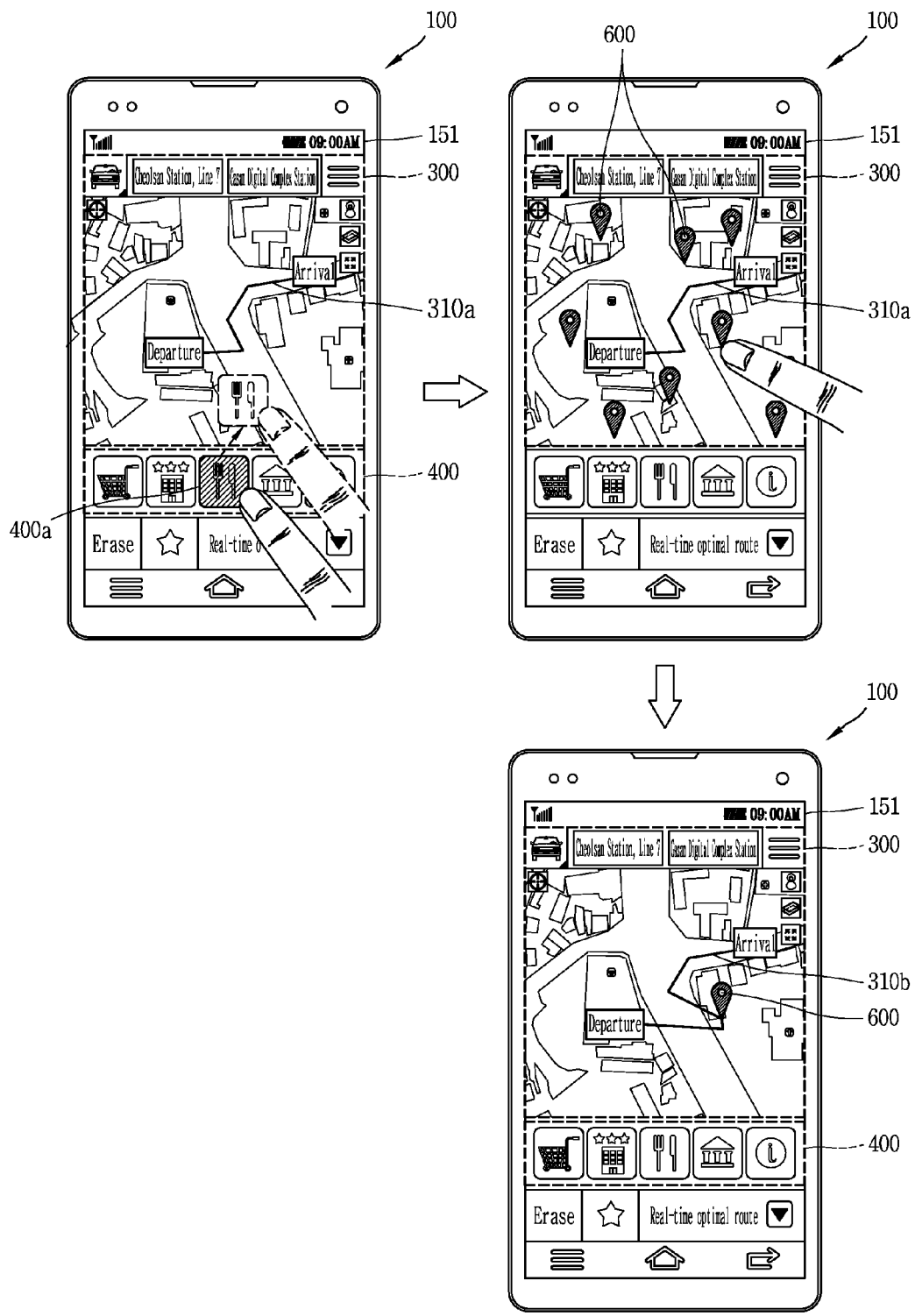
FIGS. 5A and 5B are conceptual views for explaining a method of changing preset route information using a graphic object linked to category information associated with place information.
Figure 5B:
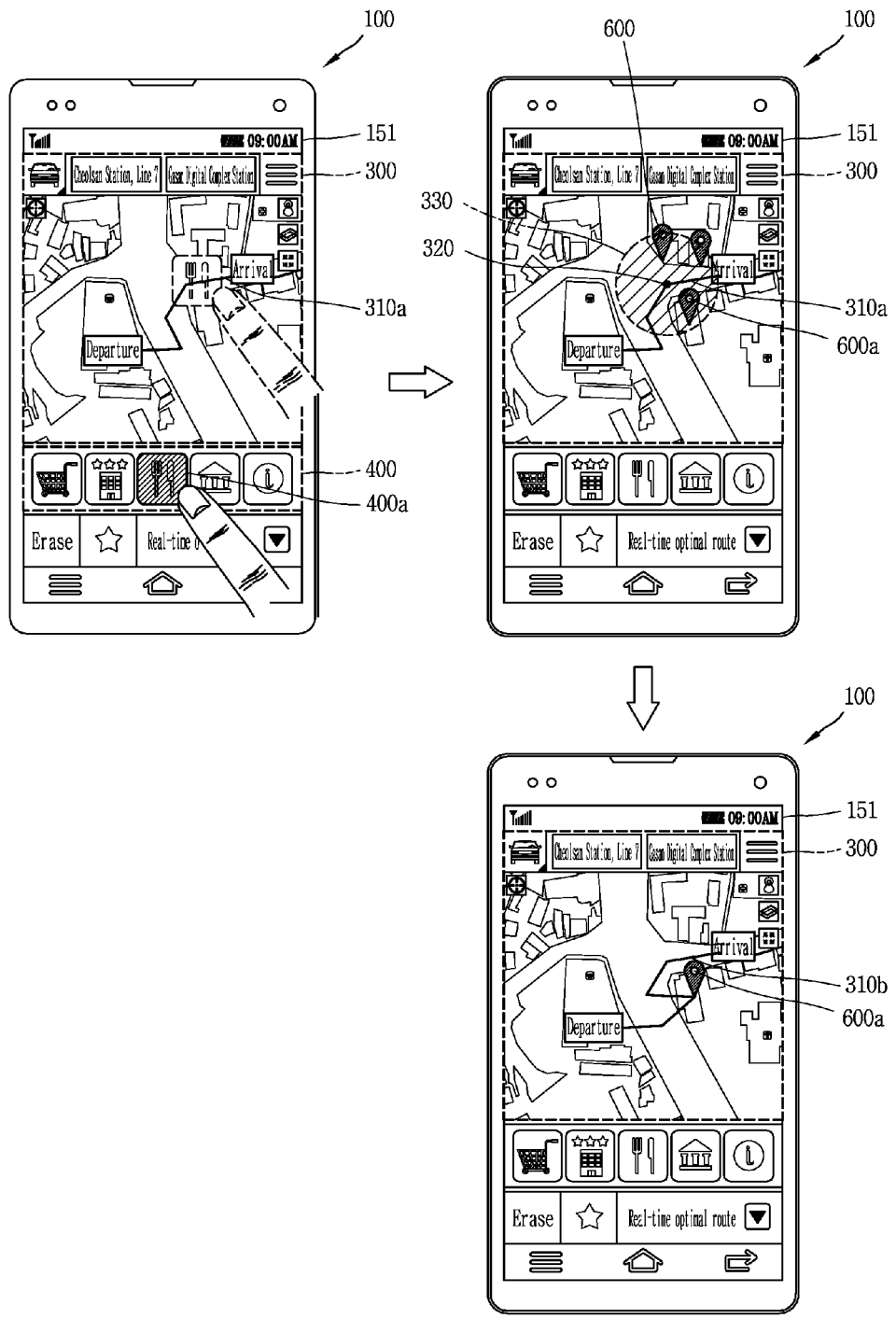

FIGS. 4A and 4B are conceptual views for explaining a method of changing preset route information using a graphic object linked to place information, and FIGS. 5A and 5B are conceptual views for explaining a method of changing preset route information using a graphic object linked to category information associated with place information.

At least one place information may be linked to the graphic object 400 linked to the place information. In other words, one place information may be linked to one graphic object 400 or at least two different place information may be linked thereto.

When a drag touch started from the graphic object 400a linked to the at least one place information is released from the map information 300, the controller 180 may change the preset route information 310a to pass through a place corresponding to any one place information among the at least one place information.

For example, as illustrated in the first drawing of FIG. 4A, the controller 180 may sense a drag touch started from any one graphic object 400a among at least one graphic object 400 linked to place information being released from the map information 300.

At least one place information may be linked to the any one graphic object 400a. For example, place information on restaurant "A" and place information on restaurant "B" may be linked to the any one graphic object 400a.

The place information on restaurants "A" and "B" may be place information previously set by a user or place information searched from the map information 300 currently displayed based on restaurant category information. Meanwhile, when place information (for example, restaurant "C") set by the user is not contained in the currently displayed map information 300, the controller 180 may reduce the map information 300 to display place information (restaurant "C") set by the user.

Otherwise, even when place information (for example, restaurant "C") set by the user is not contained in the currently displayed map information 300, the controller 180 may maintain a display size of the map information, and limit the display of place information (restaurant "C") set by the user. In other words, the controller 180 may use only place information linked to graphic object 400a among place information contained in the map information 300 based on the map information 300 currently displayed on the display unit 151.

When a drag touch started from the any one graphic object 400a is released from the map information 300, the controller 180 may change preset route information 310a to pass through a place corresponding to any one place information among at least one place information linked to the any one graphic object 400a. In other words, the changed route information 301b may be formed to pass through a place corresponding to any one place information among the at least one place information.

The controller 180 may select (determine) any one place information satisfying a preset condition among the at least one place information linked to the graphic object 400a to which a drag touch is applied.

The any one place information satisfying a preset condition may be at least one of place information previously set by a user, place information having the largest value linked to the place information, and place information located the nearest to the preset route information among the at least one place information.

For example, as illustrated in the second drawing of FIG. 4A, when place information on restaurant "A" and place information on restaurant "B" are linked to the graphic object 400a, the controller 180 may change preset route information 310a to pass through a place corresponding to place information satisfying a preset condition.

For example, when the preset condition is to select the largest value linked to place information, the controller 180 may select place information (place information on restaurant "A") linked to a higher value between place information on restaurant "A" and place information on restaurant "B". Here, the value linked to place information may be a score set by user(s), for example, rating. Then, the controller 180 may change preset route information 310a to route information to pass through a place (restaurant "A") corresponding to the selected place information, and display the changed route information 310b on the map information 300.

For another example, when the preset condition is to select place information located the nearest to preset route information, as illustrated in the third drawing of FIG. 4B, the controller 180 may select place information (restaurant "B") located the nearest to the preset route information 310a among at least one place information (for example, place information on restaurant "A" and place information on restaurant "B") linked to the graphic object 400a. Then, the controller 180 may change route information 310a to route information to pass through a place (restaurant "B") corresponding to the selected place information, and display the changed route information 310b on the map information 300.

The preset condition may be set by a user or set according to the control of the controller.

On the other hand, category information associated with place information may be linked to the graphic object 400. As information indicating categories classified according to a specific criteria of classification, the category information is understood as high-level concepts for classifying place information, such as bus, subway, restaurant, cafe, bakery, bank, hospital, entertainment, convenience store, lodging, gas station, parking lot, sightseeing, and the like.

Hereinafter, a method of changing preset route information using a graphic object linked to category information associated with place information will be described.

As illustrated in the first drawing of FIG. 5A, when the graphic object 400a linked to specific category information is released from the map information 300, the controller 180 may delete at least one place information corresponding to category information linked to the graphic object 400. The at least one place information corresponding to the category information may be extracted within the map information 300 displayed on the display unit 151.

At least one icon 600 for guiding the selection of the extracted at least one place information may be displayed on the display unit 151 as illustrated in the second drawing of FIG. 5A.

In other words, when a drag touch started from the graphic object 400a linked to specific category information is released from the map information 300, at least one icon 600 for guiding the selection of at least one place information corresponding to category information linked to the graphic object 400a may be displayed on the map information 300.

For example, when category information linked to the graphic object 400a to which a drag touch is applied corresponds to a restaurant category, the controller 180 may extract at least one place information (for example, restaurant "A", restaurant "B", etc.) corresponding to the restaurant category among the map information 300 displayed on the display unit 151. Then, the controller 180 may display at least one icon 600 to correspond to the extracted at least one place information on the map information 300.

Then, as illustrated in the second drawing of FIG. 5A, when a preset type of touch is applied to any one icon 600a among at least one icon 600 displayed on the map information 300, the controller 180 may change preset route information 310a. The changed route information 310b may be formed to pass through place information corresponding to an icon to which the preset type of touch is applied as illustrated in the third drawing of FIG. 5A.

Here, the preset type of touch may include various types of touches linked to a route information change function. For an example, the preset type of touch may include a short (or tap) touch, a long touch, a multi-touch, a drag touch, a flick touch, a pinch-in touch, a pinch-out touch, a swipe touch, a hovering touch, and the like.

On the other hand, a location at which the at least one icon is displayed may vary according to an image of the displayed map information 300, category information linked to a graphic object to which a touch is applied, and the like.

For example, even when a graphic object linked to the same category information moves on map information, the at least one icon may be displayed at a different location according to an image of the map information 300 displayed on the display unit 151.

Furthermore, even when an image of the map information 300 displayed on the display unit 151 is the same, the at least one icon may vary according to category information linked to a graphic object moving to the map information.

On the other hand, a location at which the at least one icon is displayed may vary according to a position from which a drag touch started from the graphic object 400a is released. Specifically, even when the same image of the map information 300 is displayed on the display unit 151, and the graphic object 400a linked to the same category moves to the map information 300, the controller 180 may display the at least one icon 600 at a different location according to a position from which a drag touch started from the graphic object 400a is released.

Specifically, when the drag touch is released from a region other than the preset route information 310a among the map information 300, the icon may be displayed at a position corresponding to place information corresponding to the category information in the entire region of the map information currently displayed on the display unit.

For example, as illustrated in the first drawing of FIG. 5A, a drag touch started from the graphic object 400a linked to category information may be released from a region other than the preset route information 310a among the map information 300. Here, the controller 180 may extract place information corresponding to the category information among the map information 300 based on the map information 300 currently displayed on the display unit 151. Then, the controller 180 may display an icon at a position corresponding to the extracted place information.

On the other hand, when the drag touch is released from one position of a region displayed with the preset route information, the controller 180 may display the icon at a position corresponding to place information corresponding to the category information within a reference range based on the one position of the map information.

For example, as illustrated in the first drawing of FIG. 5B, a drag touch started from the graphic object 400a linked to category information may be released from one position 320 of a region displayed with preset route information 310a contained in the map information 300. Here, as illustrated in the second drawing of FIG. 5B, the controller 180 may display an icon 600 at a position corresponding to place information corresponding to the category information within a reference range based on the one position 320 of the map information 300.

Then, the controller 180 changes preset route information 310a based on a preset type of touch (for example, a short or long touch) being applied to any one icon 600a of the at least one icon 600, and display the changed route information 310b on the map information 300. Here, the preset route information 310a may be changed based on a preset type of touch being applied to the icon 600a. Furthermore, the changed route information 310b may be formed to pass through place information (place) corresponding to an icon to which a preset type of touch is applied.

Though not shown in the drawing, when a drag touch started from the graphic object 400a is released from a region other than the preset route information 310a, the controller 180 may display an icon within a reference range based on a position from which the drag touch is released. In other words, as illustrated in the second drawing of FIG. 5B, when a graphic object 400a linked to category information is released from one position of a region other than the route information 310a of the map information 300, at least one icon 600 may be displayed at a position corresponding to place information corresponding to the category information within a reference range based on the one position. When a preset type of touch is applied to any one of the icons, the route information 310a may be changed to pass through place information corresponding to any one icon to which the touch is applied.

Here, the controller 180 may apply a graphic effect indicating the reference range in a state that the drag touch is maintained or in a state that the drag touch is released therefrom. The graphic effect may be applied to correspond to a reference range around the graphic object 400a to which the drag touch is applied or a position from which the drag touch is released.

The size of the reference range may be determined by a user's setting or varied based on a preset type of touch (for example, a pinch-in, a pinch-out touch, a drag touch started from an edge of the region) in a region to which the graphic effect is applied. When the size of the reference range is changed, the controller 180 may further extract place information corresponding to category information contained in the size-changed reference range, and further display an icon to correspond to the extracted place information.

Furthermore, when an icon corresponding to place information is displayed within a reference range around a position from which the drag touch is released, the controller

180 may display a larger number of icons than that in case of being provided in the entire region of map information.

On the other hand, when category information associated with place information is linked to a graphic object, the description of FIGS. 4A and 4B will be applicable in an inferred manner.

For example, when at least one place information is searched as a graphic object linked to category information moves on the map information, the controller 180 may select any one place information satisfying a preset condition that has been described in FIGS. 4A and 4B among the searched at least one place information, and change preset route information to pass through the selected place information.

On the contrary, even when at least one place information is linked to a graphic object, the description of FIGS. 5A and 5B will be applicable in an inferred manner.

For example, when a graphic object linked to at least one place information moves on map information, the controller 180 may display an icon at a position corresponding to the at least one place information, and change preset route information based on a preset type of touch being applied to the icon.

Through the foregoing configuration, the present disclosure may collectively display place information corresponding to a user's desired category around his or her desired portion. Accordingly, the user may move a graphic object linked to his or her desired category information of map information to receive place information corresponding to the relevant category information.

Furthermore, the user may more specifically receive place information corresponding to the relevant category in his or her desired area (portion, region), and more conveniently change preset route information to pass through any one of the received place information.

Hereinafter, a method of setting route information using a graphic object linked to place information or category information will be described in more detail with reference to the accompanying drawings.

FIGS. 6A, 6B, 6C and 6D are conceptual views for explaining a method of setting route information using a graphic object linked to category information associated with place information.

The controller 180 may display an icon at a position corresponding to place information linked to a graphic object or place information corresponding to category information based on place information or a drag touch started from the graphic object linked to category information associated with place information being released from map information.

The controller 180 may set a departure, a destination, a stopover, or the like based on a preset type of touch being applied to the icon. Then, the controller 180 may set route information based on the set departure, destination or stopover, and displayed the set route information on the map information 300.

On the other hand, the controller 180 may display a second graphic object 410 linked to at least two first graphic objects 400 on the display unit 151. At least one second graphic object 410 may be displayed on the display unit 151.

At least two first graphic objects 400 linked to the second graphic object 410 may be linked to different category information associated with place information, respectively.

The at least two first graphic objects may be displayed on the display unit 151 based on a preset type of touch being applied to the second graphic object. When a preset type of touch is applied to the second graphic object 410, the 180 may display at least two first graphic objects 400 linked to the second graphic object on the display unit 151.

In order to display the at least two first graphic objects 400, a preset type of touch applied to a second graphic object may be a short touch or a drag touch started from the second graphic object being released from the map information 300.

Figure 6A:
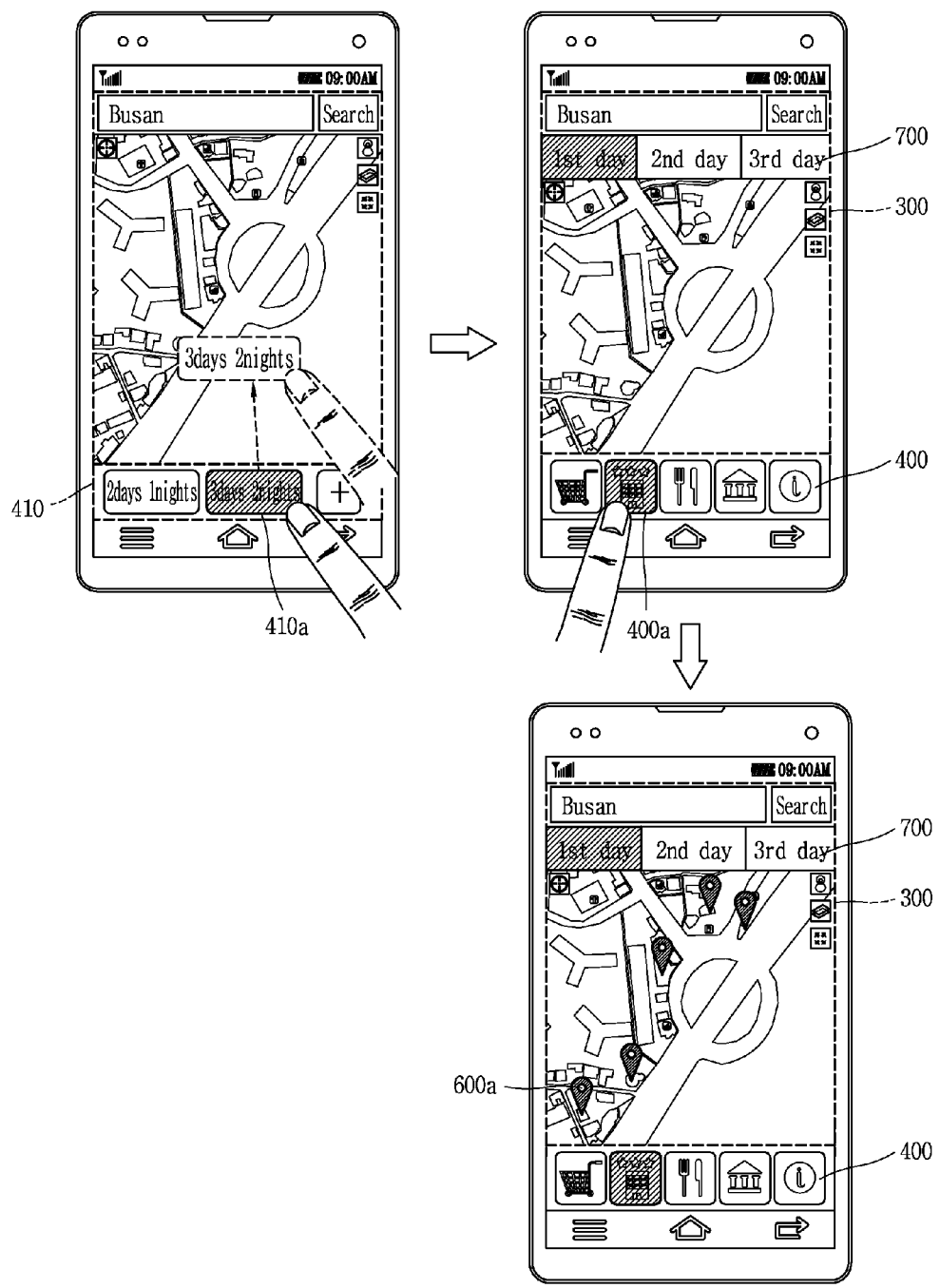
FIGS. 6A, 6B, 6C and 6D are conceptual views for explaining a method of setting route information using a graphic object linked to category information associated with place information.

For example, as illustrated in the first drawing of FIG. 6A, at least one second graphic object 410 linked to at least two first graphic objects may be displayed on the display unit 151. Here, a preset type of touch may be applied to any one second graphic object 410a among the at least one second graphic objects 410 (for example, a drag touch started from the any one second graphic object 410a may be released from the map information 300). As illustrated in the second drawing of FIG. 6A, the controller 180 may display at least two first graphic objects 400 linked to the second graphic object 410a on the display unit 151.

The at least two first graphic objects 400 may be linked to different category information accommodation space place information, respectively. When a preset type of touch is applied to any one first graphic object 400a among the at least two first graphic objects 400, the controller 180 may display an icon 600 at a position corresponding to place information corresponding to category information linked to the first graphic object 400a to which the touch is applied on the map information 300.

A preset type of touch applied to any one first graphic object 400a for displaying an icon at a position corresponding to the place information may include at least one of a short touch and a drag touch started from the first graphic object being released from the map information 300.

Specifically, when either one 400a of the at least two first graphic objects 400 is selected, the controller 180 may display at least one icon 600 capable of selecting place information corresponding to category information linked to the selected first graphic object 400a on the map information 300.

Furthermore, when a preset type of touch is applied to any one 600a of the at least one icon 600, the controller 180 may select place information corresponding to the icon 600a to which the touch is applied.

Figure 6B:
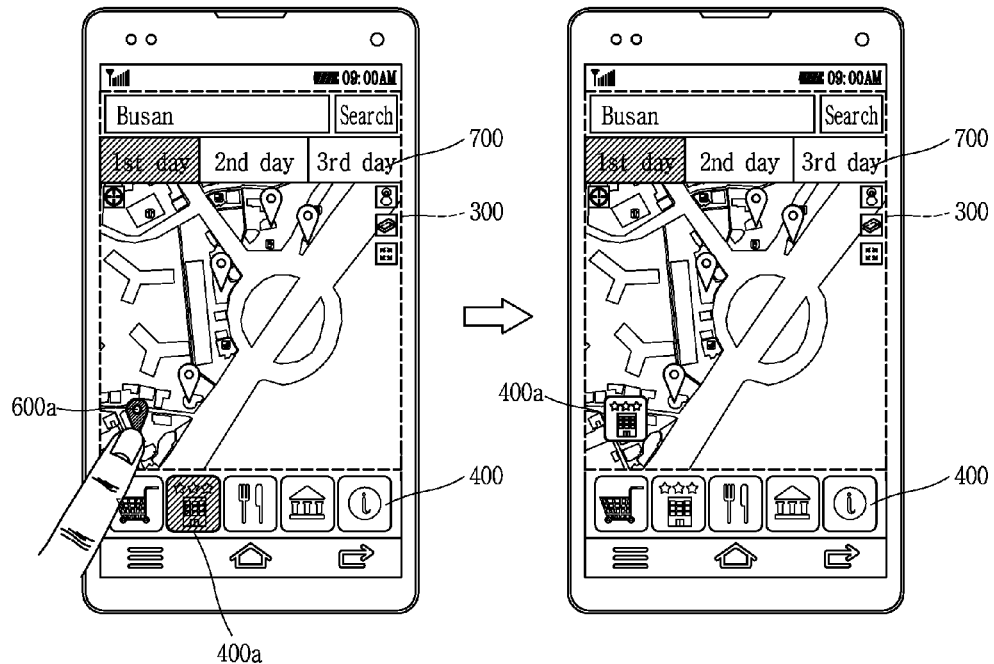

For example, in a state that at least one icon 600 is displayed on the map information 300 as illustrated in the first drawing of FIG. 6B, the controller 180 may sense a preset type of touch (for example, a short or long touch) being applied to any one icon 600a of the at least one icon 600. The controller 180 may select place information corresponding to the icon 600a to which the touch is applied.

Here, the icon 600a to which the touch is applied may be changed to the same image as that of the selected first graphic object 400a as illustrated in the second drawing of FIG. 6B. Specifically, the controller 180 may change the icon 600a to which the touch is applied to the same image as that of any one first graphic object 400a to which the touch is applied to guide the selection of the place information.

Through the foregoing method, when at least two of icons 600 displayed on the map information are selected, the controller 180 may change the selected icon to the same image as that of the first graphic object displaying the relevant icon.

For example, when any one of icons displayed through a first graphic object linked to category information "A" is selected, the controller 180 may change the selected icon to the same image 400a as that of the first graphic object linked to the category information "A". Furthermore, when any one of icons displayed through a first graphic object linked to category information "B" is selected, the controller 180 may change the selected icon to the same image 400*b* as that of the first graphic object linked to the category information "B".

Figure 6C:
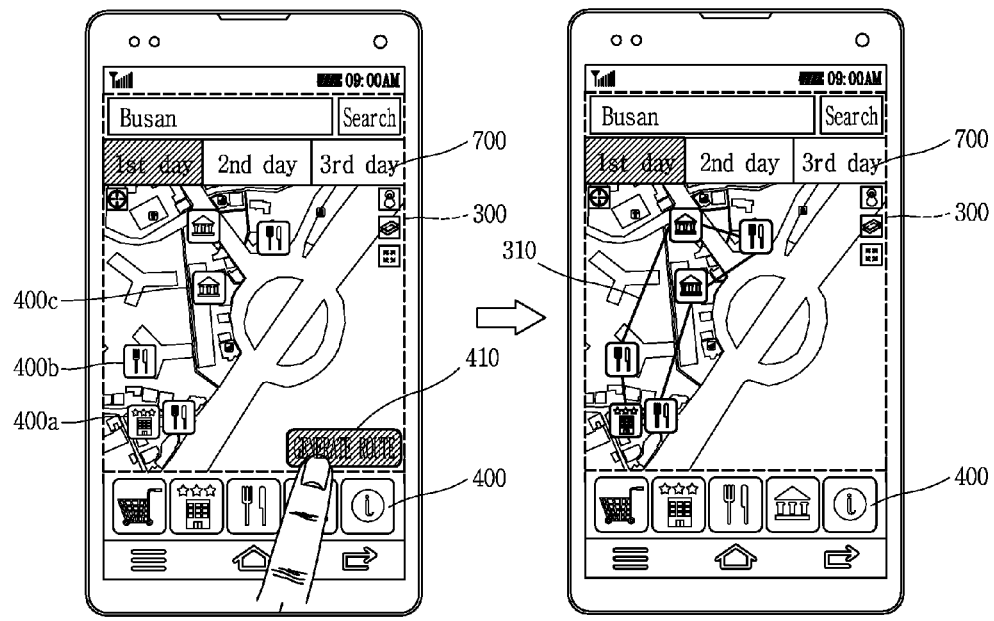
Figure 6D:
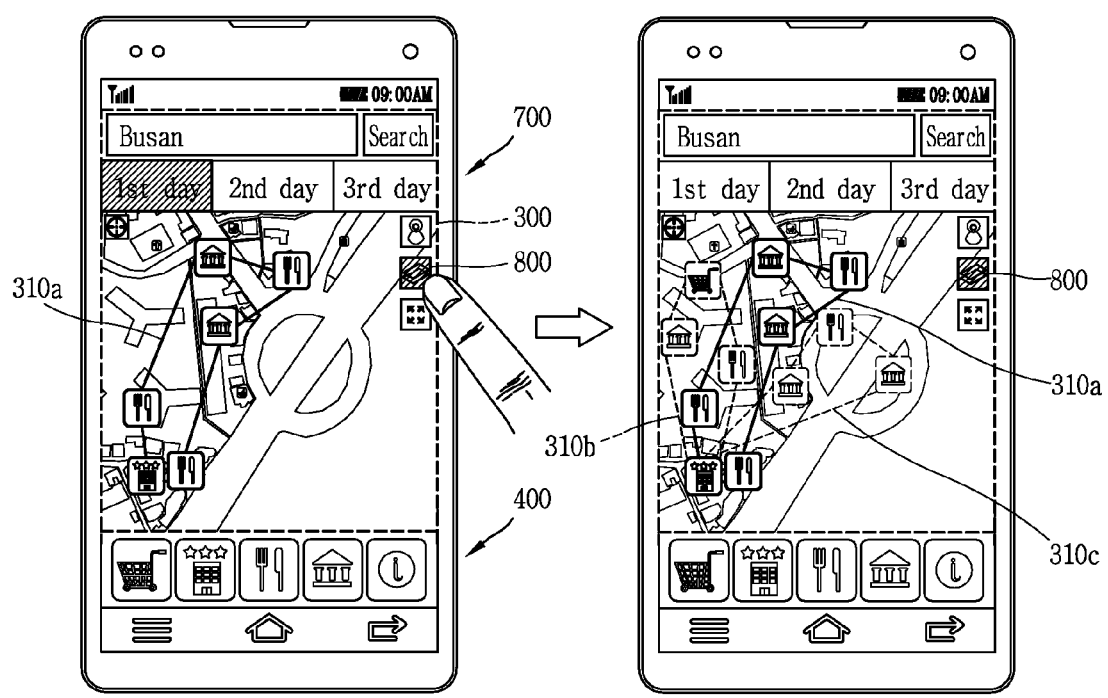

When at least two icons are selected through the foregoing process, as illustrated in the first drawing of FIG. 6C, at least two place information may be selected on the map information 300 of the display unit 151. Furthermore, images corresponding to the first graphic object corresponding to the category information corresponding to each place information may be displayed on the selected place information.

When at least two of icons displayed on the map information 300 are selected, the controller 180 may set route information using place information corresponding to the selected icons.

For example, when the at least two icons are selected, the controller 180 may display an icon 410 linked to a route information generation function on the display unit 151 as illustrated in the first drawing of FIG. 6C. When an icon 410 linked to the route information generation function is selected, the controller 180 may generate route information 310 using place information corresponding to the selected icon.

Here, the route information 310 may be set to satisfy a preset condition associated with category information based on the category information of the place information. Here, the preset condition associated with the category information may include a condition in which the category information has been previously determined, a condition in which the same category information are not consecutively set, a condition in which place information corresponding to specific category information is set to a departure, and the like.

For example, place information set on the map information are a lodging category, a restaurant category and a sightseeing category, the controller 180 may set the route information 310 to alternatively pass through place information corresponding to the restaurant and sightseeing categories using place information corresponding to the lodging category as a departure.

It should be understood for those skilled in the art that a preset condition associated with the foregoing category information may not be necessarily limited to this, and changed in various ways according to a user's setting or according to the control of the controller.

Referring to FIG. 6A again, tab count information for generating at least two tabs may be linked to the second graphic object 410. For example, as illustrated in the first drawing of FIG. 6A, each tab count information may be linked to at least one second graphic object 410, and as an example, tab count information corresponding to "3" may be linked to the second graphic object 410*a* corresponding to 3 days 2 nights.

When a preset type of touch is applied to the second graphic object 410, the controller 180 may generate at least two tabs 700 based on tab count information linked to the second graphic object 410 to which the touch is applied.

The each tab 700 may include map information.

In other words, when a preset type of touch is applied to the second graphic object 410*a*, the controller 180 may generate at least two tabs 700 containing the map information 300 based on tab count information linked to the second graphic object 410*a*.

Then, at least two route information may be set to each tab through the foregoing method described with reference to FIGS. 6A through 6C. Specifically, the controller 180 may set route information to each tab according to a user's manipulation, and display the set route information on the map information 300 contained in each tab. Here, route information set to the each tab may be different.

Here, an icon 800 linked to an overlap function may be displayed on the map information 300 contained in each tab. The controller 180 may display the map information 300 to which route information is set on the tab according to the selection of any one of the at least two tabs 700. Then, when the icon 800 linked to an overlap function is selected, the controller 180 may display route information 310*a*, 310*b*, 310*c* that are set on the at least two tabs, respectively, on one map information 300 as illustrated in the second drawing of FIG. 6D.

At least two route information 310*a*, 310*b*, 310*c* displayed on the one map information 300 may be shown with different colors to indicate route information set on different tabs or notification information (for example, first day, second day, etc.) for each tab may be displayed around the route information.

Through the foregoing configuration, the present disclosure may provide a user interface capable of more conveniently setting route information using category information associated with place information without individually searching (typing) the departure, destination, stopover, and the like. Furthermore, the present disclosure may set a travel route using second graphic objects linked to at least two first graphic objects linked to category information, and provide a plurality of route information at once, thereby enhancing the user's convenience.

Hereinafter, a method of interlocking information that can be provided from map information with another application using a graphic object will be described in more detail with reference to the accompanying drawings.

Figure 7A:
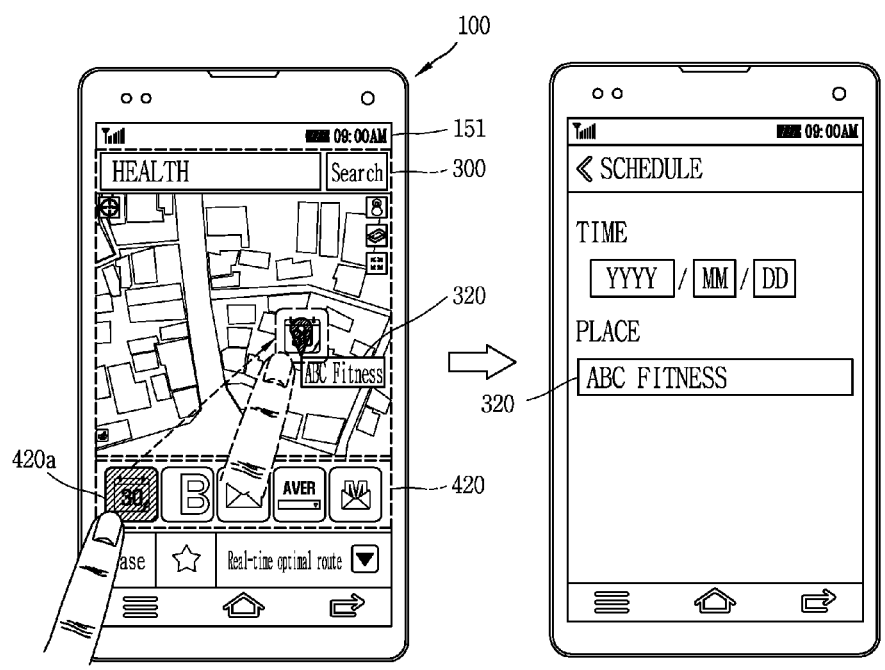
FIGS. 7A and 7B are conceptual views for explaining a method of interlocking place information contained in map information with an application using a graphic object linked to the application.
Figure 7B:
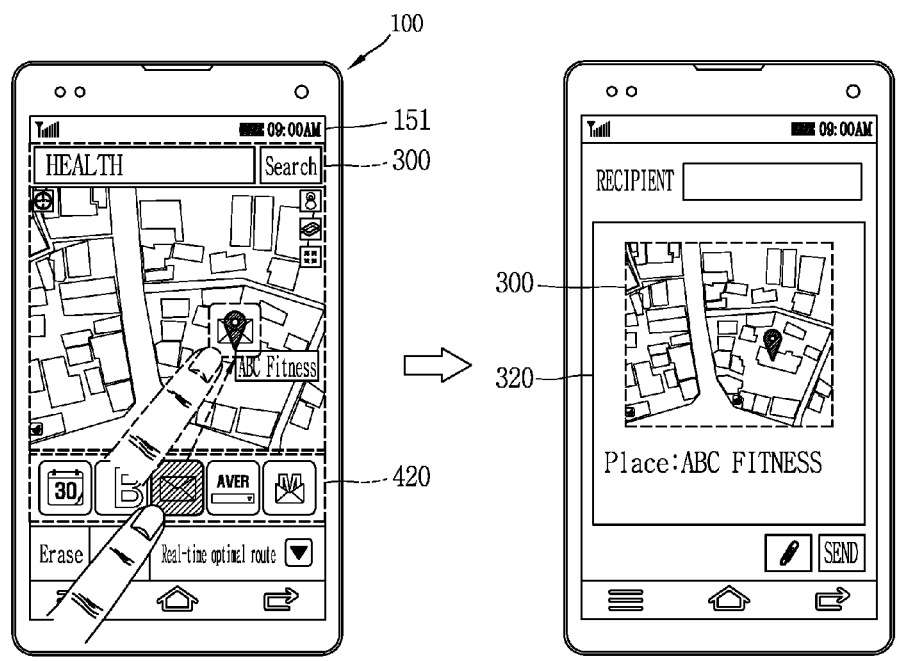

FIGS. 7A and 7B are conceptual views for explaining a method of interlocking place information contained in map information with an application using a graphic object linked to the application.

The controller 180 may display a graphic object 420 linked to map information 300 and an application on the display unit 151. Specifically, at least one graphic object 420 linked to an application may be displayed along with the map information 300 on the display unit 151.

At least one graphic object 420 linked to the application may denote an icon of the application. Furthermore, the application may denote various functions that can be provided from an application installed in the mobile terminal 100 or from the mobile terminal.

The controller 180 may perform a function associated with an application linked to any one 420*a* of the at least one graphic object 420 based on a drag touch started from the any one graphic object 420*a* linked to the application being released from the map information 300.

Here, the controller 180 may display an execution screen of the application linked to the any one graphic object 420*a* based on the release of the drag touch. The execution screen of the application may include place information corresponding to a position from which the drag touch is released.

For example, as illustrated in the first drawing of FIG. 7A, at least one graphic object 420 linked to map information 300 and an application may be displayed on the display unit 151. Then, the controller 180 may sense a drag touch started from any one graphic object 420*a* of the at least one graphic object 420 being released from the map information 300. For example, when the any one graphic object 420*a* is a graphic object linked to a schedule related application, the controller

180 may display the execution screen of the schedule related application on the display unit 151 based on the release of the drag touch.

The second drawing of FIG. 7A illustrate an execution screen of the schedule related application. Here, the execution screen of the schedule related application may include place information 320 corresponding to a position from which the drag touch is released as illustrated in FIG. 7A.

In other words, when a graphic object 420 linked to the application moves to the map information 300, the controller 180 may extract place information corresponding to a position to which the graphic object 420a has moved. Furthermore, the controller 180 may display an execution screen of the application linked to the moved graphic object 420a on the display unit 151 based on the movement of the graphic object 420a, and allow place information 320 corresponding to a position to which the graphic object 420a has moved to be contained in the execution screen of the application.

For another example, as illustrated in the first drawing of FIG. 7B, an application linked to any one graphic object 420b from which a drag touch is started among at least one graphic object 420 may be a short message service (SMS) related application. Here, the controller 180 may display an execution screen of the SMS related application on the display unit 151 based on a drag touch started from the any one graphic object 420b being released from the map information 300.

As illustrated in the second drawing of FIG. 7B, the execution screen of the SMS related application may include place information 320 (for example, fitness) corresponding to a position from which a drag touch started from the any one graphic object 400 is released. Furthermore, the controller 180 may capture the map information 300 that has been displayed on the display unit 151 prior to display the execution screen of the application, and allow the captured map information 300 to be contained in the execution screen of the application.

Though not shown in the drawing, when a drag touch started from a graphic object linked to a web-related application is released from the map information, the controller 180 may perform a web search function using place information corresponding to a position from which the drag touch is released, and display the searched page on the display unit 151.

Furthermore, when a drag touch started from a graphic object linked to a social network service (SNS) related application is released from the map information, the controller 180 may display an execution screen of the SNS related application capable of posting (sharing) place information, map information or the like corresponding to a position from which the drag touch is released on the display unit 151.

Through the foregoing configuration, the present disclosure may execute a linked application (display an execution screen of the application) using a graphic object linked to an application in a state that map information is displayed, and allow place information contained in the map information to be contained in the executed application, thereby providing a user interface capable of more conveniently using place information.

Hereinafter, a method of displaying a graphic object associated with place information on at least one of the place information contained in map information using another application and a method of using the same will be described in more detail with reference to the accompanying drawings.

FIGS. 8A, 8B, 8C and 9 are conceptual views for explaining a method of displaying a graphic object linked to place information on map information, and a method of performing various functions using the displayed graphic object.

Figure 8A:
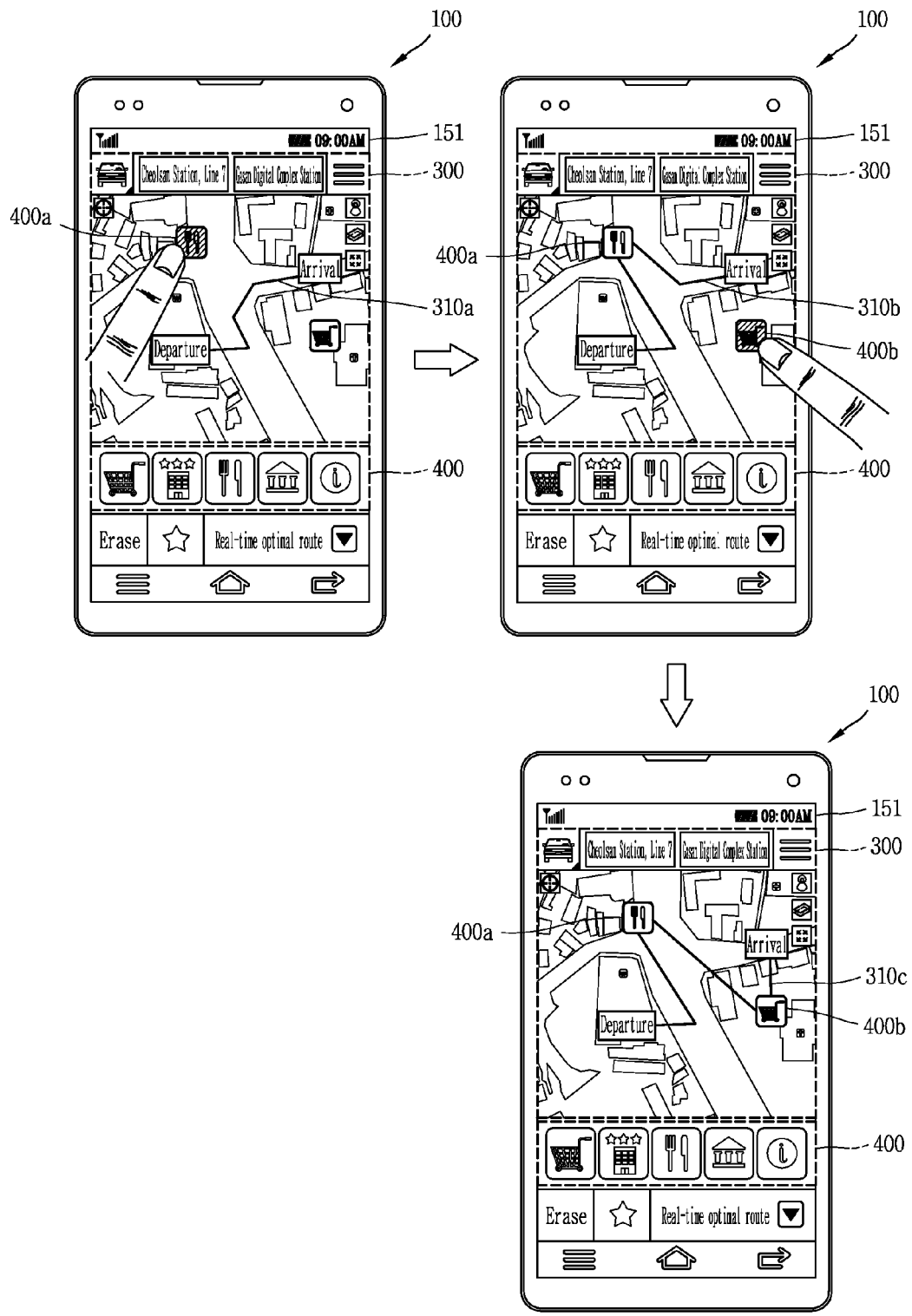
FIGS. 8A, 8B, 8C and 9 are conceptual views for explaining a method of displaying a graphic object linked to place information on map information, and a method of performing various functions using the displayed graphic object.

First, as illustrated in the first drawing of FIG. 8A, the controller 180 may display graphic objects 400a, 400b linked to place information on the map information 300. The graphic objects 400a, 400b may be linked to specific place information, respectively.

The graphic objects 400a, 400b displayed on the map information 300 may be displayed based on a user request. For example, upon receiving specific place information from a user, the controller 180 may display graphic objects 400a, 400b at a position corresponding to the specific place information based on a map information 300 display request.

For another example, as illustrated in FIGS. 6A and 6B, when an icon displayed based on a preset type of touch (for example, a short touch or a drag touch started from a graphic object being released from the map information) being applied to a graphic object associated with category information is selected, the controller 180 may display graphic objects 400a, 400b associated with place information corresponding to the icon on the map information 300.

The selection of the icon may be a short or long touch being applied to the icon or a drag touch started from the graphic object being released from the icon.

As illustrated in the first drawing of FIG. 8A, when a touch is applied to any one 400a of the graphic objects 400a, 400b in a state that the graphic objects linked to place information are displayed on the map information 300, the controller 180 may change preset route information 310a to pass through place information corresponding to the graphic object 400a to which the touch is applied. Similarly, as illustrated in the second drawing of FIG. 8A, when a touch is applied to a graphic object 400b different from the any one in a state that the changed route information 310b is displayed, the controller 180 may change the changed route information 310b again, and display route information 310c that has been changed again on the map information 300.

Though not shown in the drawing, when route information is not set on the map information 300, the controller 180 may set a departure, a destination, a stopover, and the like using graphic objects 400a, 400b linked to place information displayed on the map information. Moreover, the controller 180 may set route information using the set departure, destination, stopover, and the like, and display the set route information on the map information.

On the other hand, the controller 180 may determine place information corresponding to a graphic object displayed on the map information in connection with an application different from a map related application.

Figure 8B:
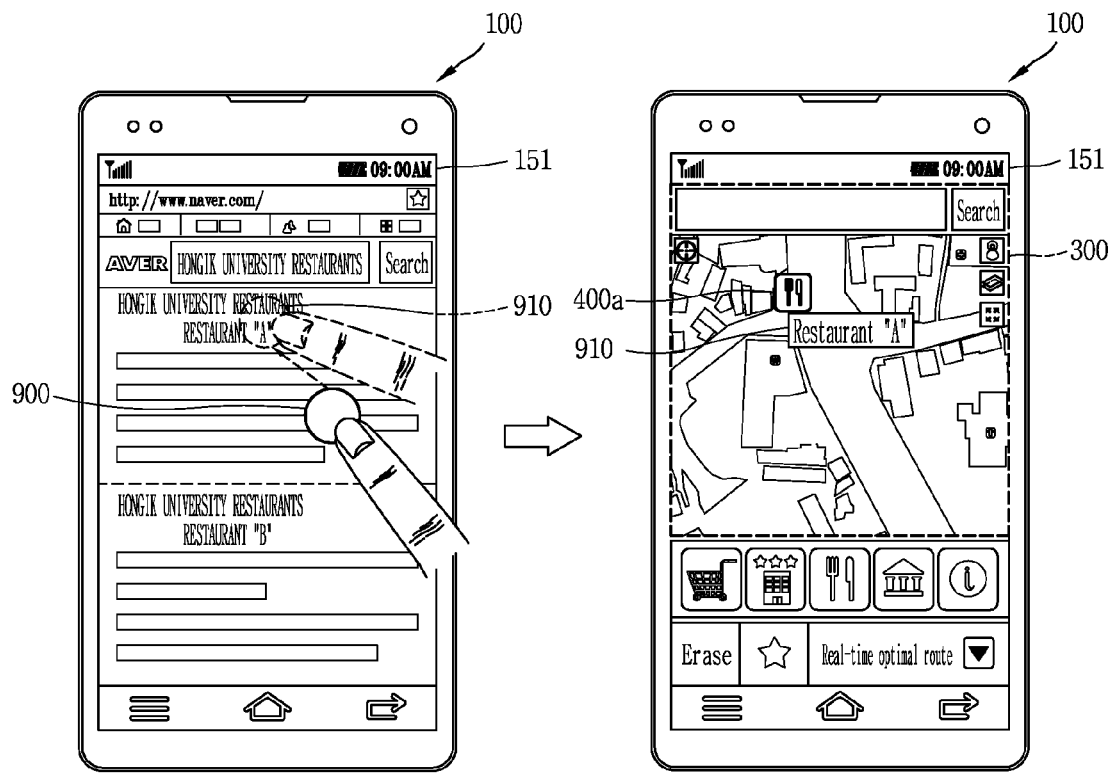

For an example, as illustrated in the first drawing of FIG. 8B, when a web-related application is executed, a web page may be displayed on the display unit 151. Here, the controller 180 may display a graphic object 900 linked to a text extraction function on the web page. Specifically, the controller 180 may display a graphic object 900 linked to the text extraction function in part of a region displayed with the web page based on the display of the web page.

Then, when a drag touch started from the graphic object 900 is released from specific text 910, the controller 180 may extract the specific text 910, and perform search using the extracted specific text 910. Here, the controller 180 may extract only text overlapped with the graphic object 900 or extract text in the unit of words containing the overlapped text.

As illustrated in the first drawing of FIG. 8B, when a drag touch started from the graphic object 900 is released from "ABC restaurant", the controller 180 may extract the text of "ABC restaurant", and search the "ABC restaurant" from the map information.

Then, the controller 180 may determine place information based on the searched result, and display a graphic object 400a linked to the place information at a position corresponding to the place information on the map information 300.

The graphic object 400a linked to the place information may be an image corresponding to category information to which the place information belongs.

In other words, the controller 180 may acquire place information using a graphic object 900 linked to a text extraction function from a web page, and display a graphic object 400a associated with place information in advance at a position corresponding to the acquired place information on the map information when a map-related application is executed.

For another example, the controller 180 may display a graphic object 400b associated with place information in advance on map information 300 while displaying the map information 300 using a shopping-related application.

Figure 8C:
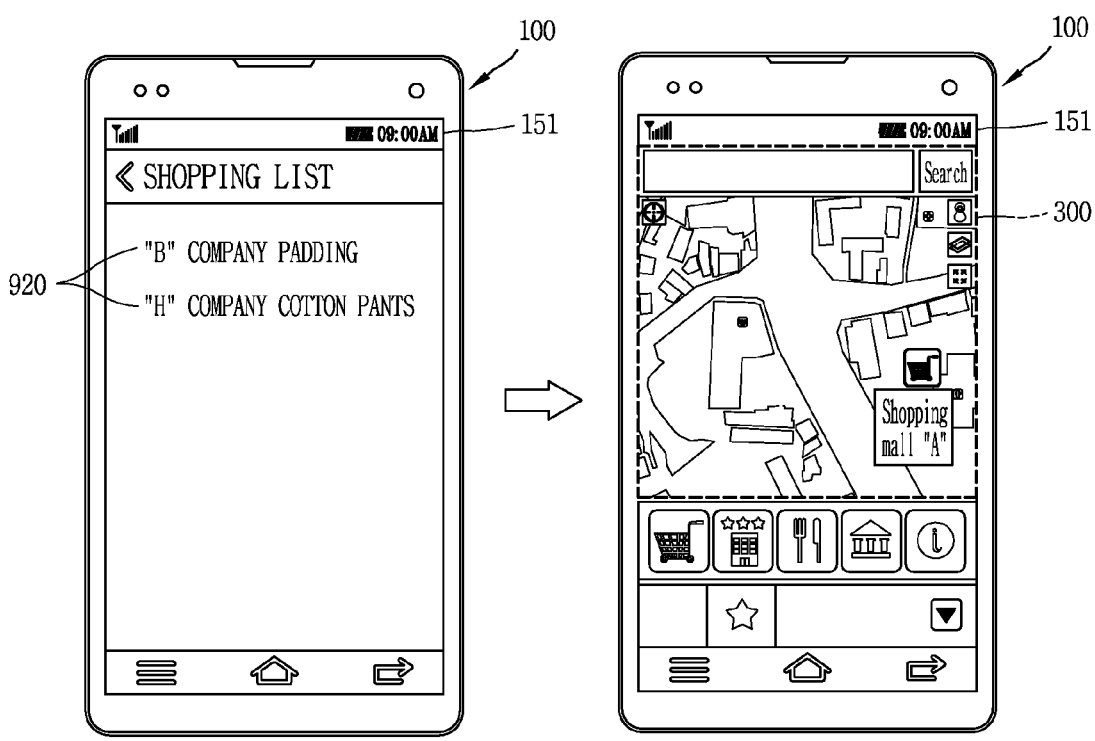

As illustrated in the first drawing of FIG. 8C, the controller 180 may receive product information 920 in a state that a shopping-related application is executed. In this case, the controller 180 may determined place information (for example, shopping mall "A") capable of purchasing the product information 820 based on the received product information.

Then, when a map-related application is executed in a state that product information is entered to the shopping-related application, the controller 180 may display map information 300 displayed with the graphic object 400b at a position corresponding to place information capable of purchasing the product information as illustrated in the second drawing of FIG. 8C.

On the other hand, the controller 180 may display various information using graphic objects 400a, 400b linked to place information displayed on the map information 300.

Figure 9:
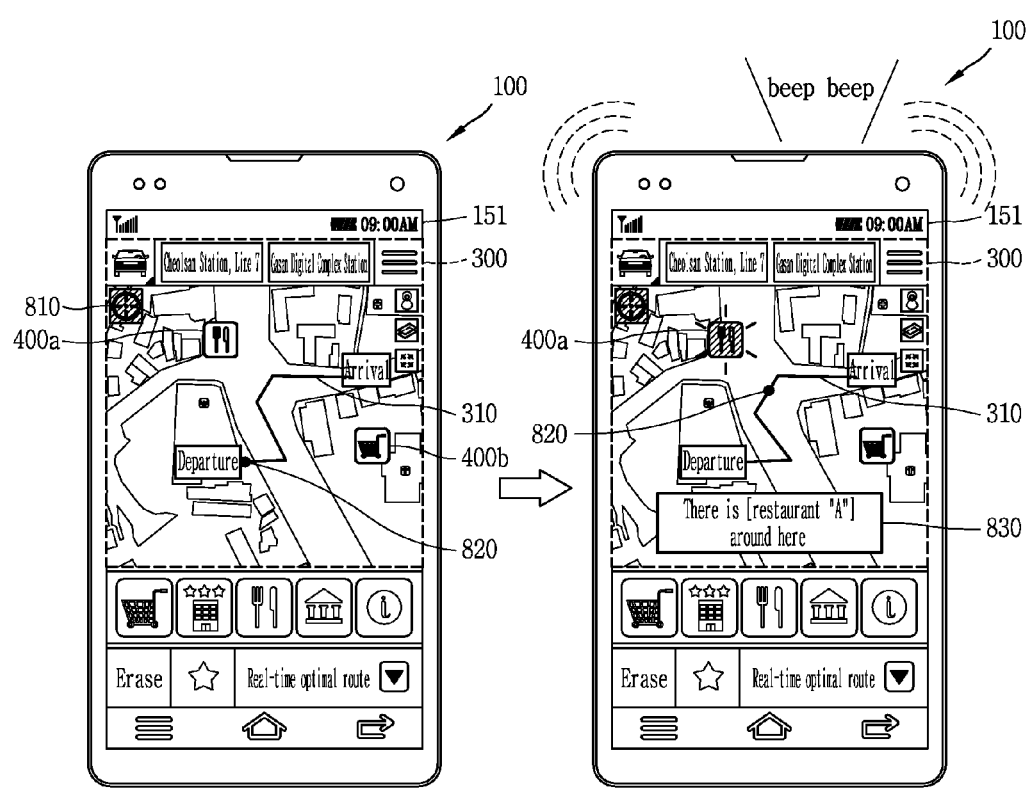

As illustrated in the first drawing of FIG. 9, an icon 810 capable of activating a GPS module may be displayed on the display unit 151. When the icon is selected, the controller 180 may acquire the location information of the mobile terminal 100. Then, the controller 180 may display an icon 820 for guiding the location of the mobile terminal 100 on the map information 300 based on the acquired location information of the mobile terminal 100.

When the location of the mobile terminal 100 is adjacent to a place linked to any one of graphic objects 400a, 400b displayed on the map information 300 (within a reference range) as the mobile terminal 100 moves, the controller 180 may change a display form of the graphic object 400a linked to the adjacent place information as illustrated in the second drawing of FIG. 9.

Furthermore, the controller 180 may display notification information 830 for notifying the adjacent place information on the display unit 151. The notification information 830 may be implemented in the form of vibrating the mobile terminal or outputting a sound.

Through the foregoing method, the present disclosure may display a graphic object linked to place information in advance on the map information in connection with (in use of) another application, and set route information or change preset route information using this, thereby enhancing the user's convenience. Furthermore, a user may reduce a burden of searching his or her desired information from another application and searching it again from a map-related application, and directly interlock (store) his or her desired information among information retrieved from another application with (in) a map-related application, thereby enhancing convenience.

As described above, the present disclosure may change preset route information or set route information using a graphic object linked to place information. Through this, the present disclosure may remove a burden of individually typing route information to change or set the route information, and provide a user interface capable of more conveniently changing or setting route information.

The present disclosure may set route information using a graphic object linked to category information associated with place information, and display at least two different route information on one map information. Through this, the present disclosure may more conveniently set route information as well as display a plurality of route information on one map information to provide a user interface capable of allowing a user to intuitively determine the plurality of route information.

The present disclosure may move a graphic object linked to a specific application to at least one of place information and route information contained in map information, thereby allowing at least one of the place information and route information to be used in the specific application. Accordingly, the present disclosure may use a graphic object linked to a specific application, thereby allowing at least one of the place information and user interface provided from map information to be more conveniently used in the specific application.

The present disclosure may display a graphic object linked to place information in advance on map information, and change route information using the previously displayed graphic object or display notification information for notifying that the mobile terminal is currently adjacent to the place information. Accordingly, the user may set his or her desired place information in advance, and receive various functions associated therewith, thereby enhancing convenience.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
  a display; and
  a controller configured to:
    cause the display to display a map in a first area of the display;
    cause the display to display, on the map, a first route from a first point to a second point;
    cause the display to display a plurality of graphic objects while the first route is displayed on the map, wherein the plurality of graphic objects are not displayed on the map and each of the plurality of graphic objects is associated with a corresponding category, and wherein each graphic object has a same size, and the plurality of graphic objects are aligned in a second area of the display;

cause the display to display a plurality of icons on the map when a first graphic object among the plurality of graphic objects is dragged and released at a location of the map, wherein the first graphic object is dragged while no icon is displayed on the map and while the first route is displayed on the map; and cause the display to display a second route in response to a touch input received with regard to one of the plurality of icons such that the second route includes a place corresponding to the one of the plurality of icons, the first route no longer displayed when the second route is displayed, wherein:

the plurality of icons are displayed on an entire area of the map when the location at which the dragged first graphic object is released is a first location of the map that does not overlap the first route;

the plurality of icons are displayed within a specific area of the map when the location at which the dragged first graphic object is released is a second location of the map that overlaps the first route, the specific area defined by a boundary that is determined based on the second location; and a size of the entire area of the map is greater than a size of the specific area of the map, wherein the controller is further configured to:

cause the display to display a second graphic object associated with an application in the second area while the map is displayed;

perform a function associated with the application in response to dragging of the second graphic object and releasing of the dragged second graphic object at a specific location indicated on the displayed map; and cause the display to display an execution screen of the application, wherein the execution screen includes information related to a place corresponding to the specific location on the map, and wherein the map and the plurality of graphic objects are not displayed when the execution screen is displayed in response to the releasing of the dragged second graphic object.

2. The mobile terminal of claim 1, wherein:
the second route further includes the first point and the second point; and
a size of the map is maintained regardless of whether the plurality of icons are displayed on the entire area of the map or within the specific area of the map.

3. The mobile terminal of claim 2, wherein:
the first route does not include the one of the plurality of icons;
the second route further includes the one of the plurality of icons such that the one of the plurality of icons is displayed on the second route.

4. The mobile terminal of claim 1, wherein:
the plurality of icons displayed on the entire area includes a first icon, a second icon, and a third icon;
the plurality of icons displayed within the specific area includes the first icon and the second icon; and
the third icon is not displayed within the specific area.

5. The mobile terminal of claim 1, wherein:
the boundary is within a reference range from the second location; and
a size of the reference range is set and variable according to a user's setting.

6. The mobile terminal of claim 5, wherein
the boundary is circular with the second location located at a center of the circular boundary.

7. The mobile terminal of claim 4, wherein the plurality of graphic objects are continuously displayed when the second route is displayed on the map.

8. The mobile terminal of claim 1, wherein the controller is further configured to cause the display to:
display a third graphic object linked to at least two fourth graphic objects while the map is displayed, wherein a different category associated with a specific place is linked to each of the at least two fourth graphic objects; and
display the at least two fourth graphic objects in response to a touch applied to the third graphic object.

9. The mobile terminal of claim 8, wherein the controller is further configured to:
cause the display to display, on the map, an icon corresponding to a place linked to one of the at least two fourth graphic objects in response to selection of the one of the at least two fourth graphic objects; and
select the place corresponding to the icon in response to a touch applied to the icon, the place further corresponding to a category linked to the one of the at least two fourth graphic objects.

10. The mobile terminal of claim 9, wherein the controller is further configured to cause the display to display a replacement icon instead of the touched icon at a same location on the map, on which the touched icon was displayed, such that the replacement icon and the selected one of the at least two fourth graphic objects have same images.

11. The mobile terminal of claim 9, wherein the controller is further configured to generate a third route based on a plurality of places corresponding to the plurality of icons displayed on the map when the plurality of icons are selected from the map.

12. The mobile terminal of claim 11, wherein the controller is further configured to cause the display to display the third route in response to a command that is received after the plurality of icons are selected.

13. The mobile terminal of claim 8, wherein:
the controller is further configured to generate at least two tabs in response to a touch applied to the third graphic object; and
each of the at least two tabs is associated with a map including a different route.

14. The mobile terminal of claim 13, wherein the controller is further configured to cause the display to:
display a third route in response to selection of a first tab among the at least two tabs;
display a fourth route in response to selection of a second tab among the at least two tabs; and
display the third route and the fourth route together on the map in response to selection of an icon associated with an overlap function for displaying all routes associated with the at least two tabs at once, the icon displayed while the at least two tabs are displayed.

15. The mobile terminal of claim 1, wherein the controller is further configured to:
cause the display to display, on the map, a third graphic object associated with a specific place in the second area; and cause output of notification when a current location of the mobile terminal is within a threshold distance from the specific place, wherein the output of the notification comprises at least:
changing a display format of the displayed third graphic object associated with the specific place;
outputting an audio signal via an audio output unit;
outputting text notification information; or
vibrating the mobile terminal.

16. A method of controlling a mobile terminal, the method comprising:

displaying, on a display, a map containing a first route from a first point to a second point in a first area of the display;

displaying a plurality of graphic objects while the first route is displayed on the map, wherein the plurality of graphic objects are not displayed on the map and each of the plurality of graphic objects is associated with a corresponding category, and wherein each graphic object has a same size, and the plurality of graphic objects are aligned in a second area of the display;

displaying a plurality of icons on the map when a first graphic object among the plurality of graphic objects is dragged and released at a location of the map, wherein the first graphic object is dragged while no icon is displayed on the map and while the first route is displayed on the map; and displaying a second route in response to a touch input received with regard to one of the plurality of icons such that the second route includes a place corresponding to the one of the plurality of icons, the first route no longer displayed when the second route is displayed, wherein:

the plurality of icons are displayed on an entire area of the map when the location at which the dragged first graphic object is released is a first location of the map that does not overlap the first route;

the plurality of icons are displayed within a specific area of the map when the location at which the dragged first graphic object is released is a second location of the map that overlaps the first route, the specific area defined by a boundary that is determined based on the second location; and a size of the entire area of the map is greater than a size of the specific area of the map, wherein the method further comprises:

displaying a second graphic object associated with an application in the second area while the map is displayed;

performing a function associated with the application in response to dragging of the second graphic object and releasing of the dragged second graphic object at a specific location indicated on the displayed map; and displaying an execution screen of the application on the display, wherein the execution screen includes information related to a place corresponding to the specific location on the map, and wherein the map and the plurality of graphic objects are not displayed when the execution screen is displayed in response to the releasing of the dragged second graphic object.

17. The method of claim 16, wherein:

the second route further includes the first point and the second point; and a size of the map is maintained regardless of whether the plurality of icons are displayed on the entire area of the map or within the specific area of the map.

18. The method of claim 17, wherein:

the first route does not include the one of the plurality of icons;

the second route further includes the one of the plurality of icons such that the one of the plurality of icons is displayed on the second route.

* * * * *